(12) United States Patent
Iida et al.

(10) Patent No.: US 7,643,117 B2
(45) Date of Patent: Jan. 5, 2010

(54) LIQUID CRYSTAL PANEL AND LIQUID CRYSTAL DISPLAY APPARATUS

(75) Inventors: Toshiyuki Iida, Osaka (JP); Akinori Izaki, Osaka (JP); Hisae Sugihara, Osaka (JP); Yutaka Ohmori, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 219 days.

(21) Appl. No.: 11/996,539

(22) PCT Filed: Apr. 17, 2007

(86) PCT No.: PCT/JP2007/058305

§ 371 (c)(1),
(2), (4) Date: Jan. 23, 2008

(87) PCT Pub. No.: WO2007/132618

PCT Pub. Date: Nov. 22, 2007

(65) Prior Publication Data

US 2009/0046224 A1    Feb. 19, 2009

(30) Foreign Application Priority Data

May 11, 2006  (JP) ............................. 2006-132418

(51) Int. Cl.
*G02F 1/1335* (2006.01)
*G02F 1/1337* (2006.01)

(52) U.S. Cl. .................. 349/117; 349/119; 349/96; 349/130

(58) Field of Classification Search ............ 349/117, 349/118, 119, 96, 130
See application file for complete search history.

(56) References Cited

U.S. PATENT DOCUMENTS 7,012,663 B2 *  3/2006  Ono et al. ................. 349/118
(Continued)

FOREIGN PATENT DOCUMENTS

JP          3648240 B2       5/2005
JP       2006089696 A        4/2006
(Continued)

OTHER PUBLICATIONS

International Search Report of PCT/JP2007/058305, date of mailing May 29, 2007.

*Primary Examiner*—Mike Qi
(74) *Attorney, Agent, or Firm*—Westerman, Hattori, Daniels & Adrian, LLP

(57) ABSTRACT

There is provided a liquid crystal panel, in which a color shift in an oblique direction is small even when observed from any azimuth angle of 0° to 360°, and the viewing angle in the horizontal direction is wide. A liquid crystal panel according to the present invention includes: a liquid crystal cell; a first polarizer placed on one side of the liquid crystal cell; a second polarizer placed on the other side of the liquid crystal cell; and a first optical compensation layer and a second optical compensation layer placed between the first polarizer and the second polarizer, wherein: the first optical compensation layer is placed between the first polarizer and the liquid crystal cell; a slow axis direction of the first optical compensation layer is substantially perpendicular to an absorption axis direction of the first polarizer; the first optical compensation layer has a refractive index profile of nx>ny≧nz; the first optical compensation layer includes a retardation film (A) which contains a polyvinyl acetal-based resin and whose in-plane retardation value (Re[750]) at a wavelength of 750 nm is larger than an in-plane retardation value (Re[550]) at a wavelength of 550 nm; the second optical compensation layer is placed between the first optical compensation layer and the second polarizer; and the second optical compensation layer has a refractive index profile of nx=ny>nz.

8 Claims, 7 Drawing Sheets

U.S. PATENT DOCUMENTS

| | | | |
|---|---|---|---|
| 7,330,232 B2 * | 2/2008 | Jeon et al. | 349/119 |
| 2004/0239852 A1 | 12/2004 | Ono et al. | |
| 2006/0012738 A1 | 1/2006 | Yoshida et al. | |
| 2006/0244884 A1 | 11/2006 | Jeon et al. | |

FOREIGN PATENT DOCUMENTS

| | | |
|---|---|---|
| WO | 03032060 A1 | 4/2003 |
| WO | 2004068225 A1 | 8/2004 |

\* cited by examiner

LIQUID CRYSTAL PANEL AND LIQUID CRYSTAL DISPLAY APPARATUS

TECHNICAL FIELD

The present invention relates to a liquid crystal panel and a liquid crystal display apparatus. More specifically, the present invention relates to a liquid crystal panel having at least two optical compensation layers between a first polarizer and a second polarizer, and to a liquid crystal display apparatus using the same.

BACKGROUND ART

In a liquid crystal cell of a vertical aligned (VA) mode, liquid crystal molecules are aligned homeotropically in the absence of an electric field. Therefore, in the case where a liquid crystal panel having a liquid crystal cell of a VA mode is observed in an oblique direction, liquid crystal molecules are apparently aligned in the oblique direction. At this time, incident light entered into the liquid crystal cell from a backlight changes due to the birefringence of the liquid crystal molecules, so light leakage occurs (consequently, a contrast in the oblique direction decreases) in a liquid crystal display apparatus. Further, in the liquid crystal cell of the VA mode, two polarizers are placed on both sides of the liquid crystal cell so that absorption axes are in a perpendicular state (which may also be referred to as a cross Nicole state). In the oblique direction, apparently, the absorption axes of the polarizers are in a displaced state (non-perpendicular state). Therefore, in the liquid crystal display apparatus, light leakage caused by the displacement of the absorption axes also occurs.

In order to reduce the light leakage of the liquid crystal display apparatus and to obtain a clear black display, there has been disclosed a liquid crystal panel using a retardation film which exhibits characteristics (reverse wavelength dispersion property) that a retardation value measured with light having a longer wavelength is larger than the retardation value measured with light having a shorter wavelength (e.g., see Patent Document 1). However, the liquid crystal display apparatus having a conventional liquid crystal panel has problems in that a display color changes (a color shift in the oblique direction is large) depending upon the observation azimuth in the oblique direction, and the viewing angle in the horizontal direction are narrow (a contrast in the oblique direction at an azimuth angle of 0°-180° is low).

Patent Document 1: JP 3648240 B

DISCLOSURE OF THE INVENTION

Problems to be Solved by the Invention

The present invention has been made to solve the conventional problems as described above, and it is therefore an object of the invention to provide a liquid crystal panel and a liquid crystal display apparatus, in which a color shift in an oblique direction is small even when observed from any azimuth angle of 0° to 360°, and the viewing angle in the horizontal direction is wide.

Means for Solving the Problems

A liquid crystal panel according to an embodiment of the present invention includes: a liquid crystal cell; a first polarizer placed on one side of the liquid crystal cell; a second polarizer placed on the other side of the liquid crystal cell; and a first optical compensation layer and a second optical compensation layer placed between the first polarizer and the second polarizer, wherein: the first optical compensation layer is placed between the first polarizer and the liquid crystal cell; a slow axis direction of the first optical compensation layer is substantially perpendicular to an absorption axis direction of the first polarizer; the first optical compensation layer has a refractive index profile of nx>ny≧nz; the first optical compensation layer includes a retardation film (A) which contains a polyvinyl acetal-based resin and whose in-plane retardation value (Re[750]) at a wavelength of 750 nm is larger than an in-plane retardation value (Re[550]) at a wavelength of 550 nm; the second optical compensation layer is placed between the first optical compensation layer and the second polarizer; and the second optical compensation layer has a refractive index profile of nx=ny>nz.

In one embodiment of the invention, an in-plane retardation value (Re[750]) at a wavelength of 750 nm of the second optical compensation layer is smaller than an in-plane retardation value (Re[550]) at a wavelength of 550 nm of the second optical compensation layer.

In another embodiment of the invention, a difference ($\Delta D = D_1 - D_2$) between a wavelength dispersion value ($D_1$) of the first optical compensation layer and a wavelength dispersion value ($D_2$) of the second optical compensation layer is 0.1 or more.

In still another embodiment of the invention, the liquid crystal cell includes a liquid crystal layer containing liquid crystal molecules aligned homeotropically in an absence of an electric field.

In still another embodiment of the invention, the polyvinyl acetal-based resin includes a repeating unit represented by the following general formula (I):

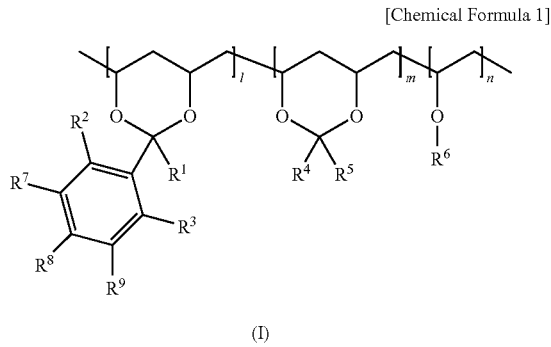

[Chemical Formula 1]

(I)

where $R^1$, $R^4$, and $R^5$ independently represent a hydrogen atom, a straight-chain or branched-chain alkyl group containing 1 to 8 carbon atoms, a cycloalkyl group containing 5 to 10 carbon atoms, a phenyl group, a naphthyl group, a hetero-ring group, an anthranyl group, or a phenanthrenyl group, and the cycloalkyl group, the phenyl group, the naphthyl group, the hetero-ring group, the anthranyl group, and the phenanthrenyl group may respectively have a substituent; $R^2$, $R^3$, $R^7$, $R^8$, and $R^9$ independently represent a hydrogen atom, a straight-chain or branched-chain alkyl group containing 1 to 4 carbon atoms, a straight-chain or branched-chain alkoxyl group containing 1 to 4 carbon atoms, an alkoxycarbonyl group, an acyloxy group, a halogen atom, a halogenated alkyl group, a nitro group, an amino group, an azido group, a hydroxyl group, a cyano group, or a thiol group, provided that $R^2$ and $R^3$ are not hydrogen atoms simultaneously; $R^6$ represents a hydrogen atom, a straight-chain or branched-chain alkyl group containing 1 to 8 carbon atoms, a benzyl group, a silyl group, a phosphate group, an acyl group, a benzoyl group, or a sulfonyl group; two groups adjacent to each other, selected from $R^2$, $R^3$, $R^7$, $R^8$, and $R^9$ may form a benzene ring to form a naphthyl ring, the naphthyl ring may have, as a substituent, a halogen atom, a straight-chain or branched-chain alkyl group containing 1 to 4 carbon atoms, a straight-chain or branched-chain halogenated alkyl group containing 1 to 4 carbon atoms, a straight-chain or branched-chain alkoxy group containing 1 to 4 carbon atoms, an alkoxycarbonyl group, an acyloxy group, an amino group, an azido group, a nitro group, a cyano group, or a hydroxyl group; and l, m, and n represent an integer of 2 or more.

In still another embodiment of the invention, the retardation film (A) has an absolute value of a photoelastic coefficient of $40 \times 10^{-12}$ (m$^2$/N) or less.

In still another embodiment of the invention, the second optical compensation layer includes a retardation film (B) containing a polyimide-based resin.

According to another aspect of the invention, a liquid crystal display apparatus is provided. The liquid crystal display apparatus includes the above-described liquid crystal panel.

Effects of the Invention

As described above, according to the present invention, by using an optical compensation layer having specific optical properties with a specific positional relationship, a liquid crystal panel and a liquid crystal display apparatus can be provided, in which a color shift in the oblique direction is small even when a screen is observed from any azimuth angle of 0° to 360°, and further, the viewing angle in the horizontal direction is wide.

DESCRIPTION OF REFERENCE NUMERALS

Figure 1A:
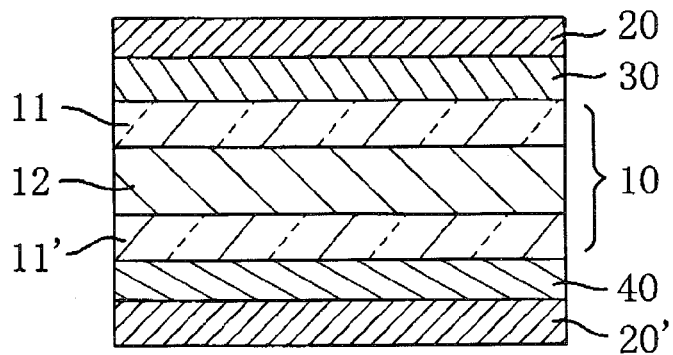
FIGS. 1(a) to 1(c) are each a schematic cross-sectional view of a liquid crystal panel according to a preferred embodiment of the present invention.

10 Liquid crystal cell
20 First polarizer
20' Second polarizer
30 First optical compensation layer
40 Second optical compensation layer
11, 11' Substrate
12 Liquid crystal layer
100 Liquid crystal panel

BEST MODE FOR CARRYING OUT THE INVENTION

Definition of Terms and Symbols

The definition of the terms and symbols in the specification of the present invention are as follows.

(1) "nx" represents a refractive index in a direction in which an in-plane refractive index becomes maximum (i.e., in a slow axis direction), "ny" represents a refractive index in a direction perpendicular to the slow axis in a plane, and "nz" represents a refractive index in a thickness direction.

(2) An in-plane retardation value (Re[λ]) refers to an in-plane retardation value of a film (layer) at a wavelength λ (nm) at 23° C. Re[λ] is obtained by Re[λ]=(nx−ny)×d where the thickness of the film (layer) is d (nm).

(3) R40 [λ] represents a retardation value measured by tilting by 40° from a normal direction of a layer (film) at a wavelength λ (nm) at 23° C.

(4) A thickness direction retardation value (Rth[λ]) refers to a retardation value in a film (layer) thickness direction at a wavelength λ (nm) at 23° C. Rth[λ] is obtained by Rth[λ]=(nx−nz)×d where the thickness of the film (layer) is d (nm).

(5) An Nz coefficient is a ratio between Rth[550] and Re[550], and is obtained by Nz coefficient =Rth[550]/Re[550].

(6) The phrase "substantially perpendicular" includes a range in which the angle formed by respective optical axes (for example, an absorption axis in the case of a polarizer, and a slow axis in the case of an optical compensation layer) of two optical members is 90°±2.0°, and preferably 90°±1.0°. The phrase "substantially parallel" includes a range in which the angle formed by respective optical axes (for example, an absorption axis in the case of a polarizer, and a slow axis in the case of an optical compensation layer) of two optical members is 0°±2.0°, and preferably 0°±1.0°.

(7) A wavelength dispersion value ($D_1$) is a value calculated by an expression: Re[750]/Re[550]. A wavelength dispersion value ($D_2$) is a value calculated by an expression: R40[750]/R40[550].

(8) In the specification of the present invention, "nx=ny" or "ny=nz" include not only the case where they are completely the same, but also the case where they are substantially the same. Thus, even when it is described that nx=ny, Re may not be 0, and even when ny=nz, Re may not be equal to Rth.

(9) In the specification of the present invention, for example, a subscript "1" represents a first optical compensation layer, and a subscript "2" represents a second optical compensation layer.

A-1. Outline of a Liquid Crystal Panel

The liquid crystal panel of the present invention includes a liquid crystal cell, a first polarizer placed on one side of the liquid crystal cell, a second polarizer placed on the other side of the liquid crystal cell, and a first optical compensation layer and a second optical compensation layer placed between the first polarizer and the second polarizer.

The first optical compensation layer is placed between the first polarizer and the liquid crystal cell. The slow axis direction of the first optical compensation layer is substantially perpendicular to the absorption axis direction of the first polarizer. The first optical compensation layer has a refractive index profile of nx>ny≧nz. The first optical compensation layer includes a retardation film (A) which contains a polyvinyl acetal-based resin and whose in-plane retardation value (Re[750]) at a wavelength of 750 nm is larger than an in-plane retardation value (Re[550]) at a wavelength of 550 nm. The liquid crystal panel includes such a retardation film (A), whereby a liquid crystal display apparatus exhibiting excellent display characteristics can be obtained. The retardation film (A) is characterized by having more excellent reverse wavelength dispersion property, compared with a conventional retardation film, and having a small absolute value of a photoelastic coefficient. The detail of the retardation film (A) will be described later.

The second optical compensation layer is placed between the first optical compensation layer and the second polarizer. The second optical compensation layer has a refractive index profile of nx=ny>nz.

A difference ($\Delta D = D_1 - D_2$) between the wavelength dispersion value ($D_1$) of the first optical compensation layer and the wavelength dispersion value ($D_2$) of the second optical compensation layer is preferably 0.1 or more, more preferably 0.12 or more, particularly preferably 0.14 or more, and most preferably 0.16 or more. In the present invention, by setting $\Delta D$ at a specific value, remarkably optimized optical compensation is realized. Consequently, the light leakage caused by the birefringence of liquid crystal molecules and the light leakage caused by the displacement of absorption axes of polarizers can be reduced simultaneously. Such a liquid crystal panel can provide a liquid crystal display apparatus in which a color shift in an oblique direction is small even when a screen is observed from any azimuth angle of 0° to 360°, and further, the viewing angle in the horizontal direction is wide.

As described above, in the first optical compensation layer, Re[750] is larger than Re[550]. The wavelength dispersion value ($D_1$) of the first optical compensation layer is preferably 1.05 or more, more preferably 1.05 to 1.20, much more preferably 1.05 to 1.18, particularly preferably 1.07 to 1.16, and most preferably 1.09 to 1.14.

Preferably, in the second optical compensation layer, R40 [750] is smaller than R40 [550]. The wavelength dispersion value ($D_2$) of the second optical compensation layer is preferably 0.95 or less, more preferably 0.85 to 0.95, much more preferably 0.87 to 0.95, particularly preferably 0.89 to 0.94, and most preferably 0.91 to 0.94.

Figure 1B:
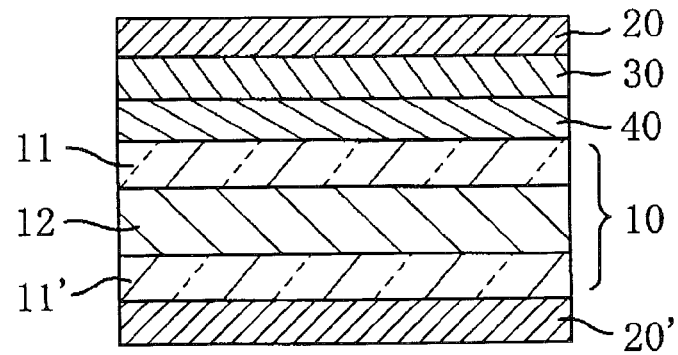
Figure 1C:
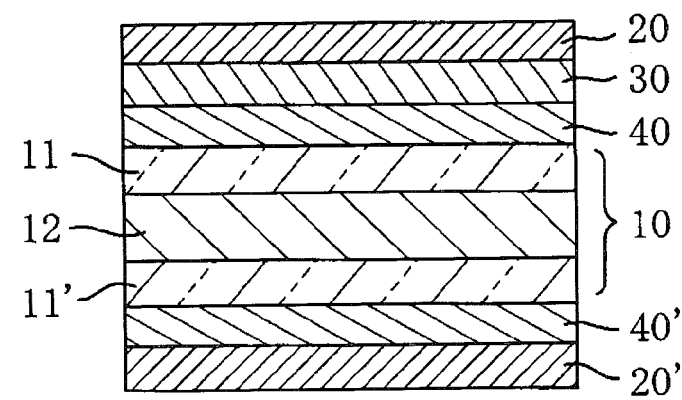

FIG. 1(a) is a schematic cross-sectional view of a liquid crystal panel according to one embodiment of the present invention. A liquid crystal panel 100 includes a liquid crystal cell 10, a first polarizer 20 placed on one side (a viewer side in the illustrated example) of the liquid crystal cell 10, a second polarizer 20' placed on the other side (a backlight side in the illustrated example) of the liquid crystal cell 10, and at least two optical compensation layers placed between the first polarizer 20 and the second polarizer 20'. The at least two optical compensation layers includes a first optical compensation layer 30 and a second optical compensation layer 40. In the illustrated example, the first optical Compensation layer 30 is placed between the first polarizer 20 and the liquid crystal cell 10, and the second optical compensation layer 40 is placed between the second polarizer 20' and the liquid crystal cell 10. FIG. 1(b) is a schematic cross-sectional view of a liquid crystal panel according to another embodiment of the present invention. In the present embodiment, the first optical compensation layer 30 and the second optical compensation layer 40 are placed between the first polarizer 20 and the liquid crystal cell 10. The second optical compensation layer 40 is placed on the liquid crystal cell 10 side of the first optical compensation layer 30. FIG. 1(c) is a schematic cross-sectional view of a liquid crystal panel according to still another embodiment of the present invention. In this embodiment, at least two optical compensation layers placed between the first polarizer 20 and the second polarizer 20' include the first optical compensation layer 30, the second optical compensation layer 40, and a third optical compensation layer 40'. The first optical compensation layer 30 and the second optical compensation layer 40 are placed between the first polarizer 20 and the liquid crystal cell 10. The second optical compensation layer 40 is placed on the liquid crystal cell 10 side of the first optical compensation layer 30. The third optical compensation layer 40' is placed between the second polarizer 20' and the liquid crystal cell 10. In the illustrative example, the first polarizer 20 is placed on a viewer side, and the second polarizer 20' is placed on a backlight side; however, they may be reversed (i.e., the first polarizer 20 may be on the backlight side, and the second polarizer 20' may be on the viewer side). A liquid crystal panel having a configuration shown in FIG. 1(a) is preferred. Optical compensation layers are placed on both sides of the liquid crystal cell, whereby a liquid crystal cell is unlikely to be distorted in the case where the optical compensation layers are expanded or shrunk, and consequently, display unevenness is unlikely to occur.

In the present invention, if required, any suitable protective film (not shown) is provided between the first polarizer 20 and the first optical compensation layer 30. Further, if required, any suitable protective film (not shown) is provided between the second polarizer 20' and the second optical compensation layer 40. Further, if required, any suitable protective film is also provided on a side of the first polarizer 20 and/or the second polarizer 20' where an optical compensation layer is not formed. By providing a protective film as described above, the polarizer can be prevented from being degraded, and a liquid crystal panel having excellent durability can be obtained. In the present invention, as till another optical compensation layer (not shown) may be provided. The kind, number, placement position, and the like of such an optical compensation layer can be appropriately selected depending upon the purpose. The detail of each constituent member and each layer shown in FIGS. 1(a) to 1(c) will be described in sections B-1 to B-5 later.

A-2. Optical Axis Relationship Between Respective Layers

The first polarizer 20 and the second polarizer 20' are typically placed so that absorption axes thereof are substantially perpendicular to each other. The slow axis direction of the first optical compensation layer 30 is substantially perpendicular to the absorption axis direction of the first polarizer 20.

B-1. Liquid Crystal Cell

The liquid crystal cell 10 includes: a pair of substrates 11 and 11'; and a liquid crystal layer 12 as a display medium arranged between the substrates. One substrate (color filter substrate) 11 is provided with a color filter, a black matrix and a counter electrode (all not shown). The other substrate (active matrix substrate) 11' is provided with: a switching element (typically, TFT) for controlling electrooptic characteristics of liquid crystal; a scanning line for providing a gate signal to the switching element and a signal line for providing a source signal thereto; and a pixel electrode (all not shown). The color filter may be provided on the active matrix substrate 11'. A space (cell gap) between the substrates 11 and 11' is controlled by a spacer (not shown). An alignment film (not shown) formed of, for example, polyimide is provided on a side of each of the substrates 11 and 11' in contact with the liquid crystal layer 12.

The liquid crystal cell includes a liquid crystal layer containing homeotropically aligned liquid crystal molecules in the absence of an electric field. The term "homeotropic alignment" refers to a state where liquid crystal molecules are aligned vertically to the surfaces of the substrates of the liquid crystal cell. A specific example of such liquid crystal cell includes a liquid crystal cell of VA (Vertical Aligned) mode.

Figure 2:
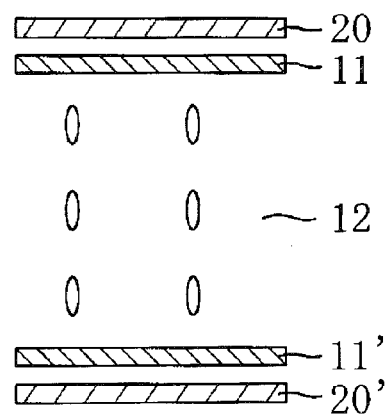
FIGS. 2(a) and 2(b) are schematic cross-sectional views illustrating an alignment state of liquid crystal molecules in a liquid crystal layer, in the case where a liquid crystal display apparatus according to the present invention adopts a liquid crystal cell of a VA mode.
Figure 2:
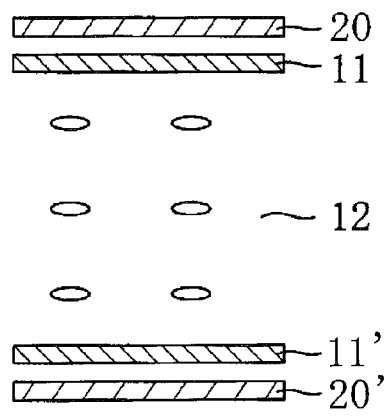

FIGS. 2(*a*) and 2(*b*) are each a schematic sectional view illustrating an alignment state of liquid crystal molecules in a VA mode. As shown in FIG. 2(*a*), liquid crystal molecules are aligned vertically to the substrates 11 and 11' without application of a voltage. Such vertical alignment is realized by arranging nematic liquid crystal having negative dielectric anisotropy between the substrates each having a vertical alignment film formed thereon (not shown). When light (specifically, linear polarized light which passed through the first polarizer 20) enters the liquid crystal layer 12 in such a state from a surface of one substrate 11, the incident light advances along a longitudinal direction of the vertically aligned liquid crystal molecules. No birefringence occurs in the longitudinal direction of the liquid crystal molecules, and thus the incident light advances without changing a polarization direction and is absorbed by the second polarizer 20' having an absorption axis perpendicular to the first polarizer 20. In this way, a dark state is displayed without application of a voltage (normally black mode). As shown in FIG. 2(*b*), longitudinal axes of the liquid crystal molecules are aligned parallel to the substrate surfaces when a voltage is applied between the electrodes. The liquid crystal molecules exhibit birefringence with linear polarized light entering the liquid crystal layer 12 in such a state, and a polarization state of the incident light changes in accordance with inclination of the liquid crystal molecules. Light passing through the liquid crystal layer during application of a predetermined maximum voltage is converted into linear polarized light having a polarization direction rotated by 90°, for example. Thus, the light passes through the second polarizer 20', and a bright state is displayed. Upon termination of voltage application, the display is returned to a dark state by an alignment restraining force. An applied voltage is changed to control inclination of the liquid crystal molecules, so as to change an intensity of light transmission from the second polarizer 20'. As a result, display of gradation can be realized.

B-2. First Optical Compensation Layer

In the specification of the present invention, the "optical compensation layer" is a layer having a birefringence in an in-plane and/or thickness direction. Preferably, the optical compensation layer has a birefringence ($\Delta n[550]$) of $1 \times 10^{-4}$ or more at a wavelength of 550 nm. The optical compensation layer may be a single layer, or may be composed of a plurality of layers. In the case where the optical compensation layer is composed of a plurality of layers, all the plurality of layers may be composed of those having a birefringence, or may be composed of at least one layer having a birefringence and at least one layer exhibiting isotropy. Examples of the optical compensation layer include: a single retardation film; a laminate including a retardation film/adhesive layer/retardation film in this order; and the like.

The first optical compensation layer is a positive uniaxial optical element (a) satisfying a refractive index profile of $nx>ny=nz$, or a negative biaxial optical element (b) satisfying a refractive index profile of $nx>ny>nz$.

The positive uniaxial optical element (a) ideally has an optical axis in one direction in a plane. An absolute value ($|Rth[550]_1 - Re[550]_1|$) of a difference between $Rth[550]_1$ and $Re[550]_1$ in the positive uniaxial optical element (a) is preferably less than 10 nm, and more preferably 5 nm or less.

In the case where the refractive index profile of the first optical compensation layer satisfies $nx>ny=nz$, $Re[550]_1$ of the first optical compensation layer (positive uniaxial optical element (a)) is preferably 10 nm or more, more preferably 70 nm to 180 nm, much more preferably 80 nm to 170 nm, particularly preferably 100 nm to 160 nm, and most preferably 120 nm to 150 nm. $Rth[550]_1$ of the first optical compensation layer is substantially the same as $Re[550]_1$.

An Nz coefficient of the positive uniaxial optical element (a) is preferably more than 0.9 and less than 1.1, and more preferably 0.95 to 1.05. The Nz coefficient in the above range can be obtained by stretching a polymer film containing a polyvinyl acetal-based resin described later by a longitudinal free-end uniaxial stretching method, for example.

In the case where the refractive index profile of the first optical compensation layer satisfies $nx>ny>nz$, $Re[550]_1$ of the first optical compensation layer (negative biaxial optical element (b)) is preferably 10 nm or more, more preferably 20 nm to 150 nm, and most preferably 30 nm to 130 nm.

$Rth[550]_1$ of the negative biaxial optical element (b) is preferably 80 nm to 250 nm, and more preferably 90 nm to 200 nm.

The difference ($Rth[550]_1 - Re[550]_1$) between $Rth[550]_1$ and $Re[550]_1$ of the above-mentioned negative biaxial optical element (b) is preferably 10 nm or more, more preferably 30 nm or more, and most preferably 50 nm to 170 nm.

The Nz coefficient of the negative biaxial optical element (b) is preferably 1.1 to 3.0, and more preferably 1.1 to 2.5. The Nz coefficient in the above range can be obtained by stretching a polymer film containing a polyvinyl acetal-based resin described later by, for example, a transverse fixed-end uniaxial stretching method, a sequential biaxial stretching method, or a longitudinal/transverse simultaneous biaxial stretching method.

The first optical compensation layer used in the present invention is preferably a positive uniaxial optical element (a) satisfying a refractive index profile of $nx>ny=nz$. This is because a liquid crystal display apparatus can be obtained in which more suitable optical compensation is performed, and a color shift in an oblique direction is further smaller.

As the thickness of the first optical compensation layer, any appropriate thickness can be adopted as long as the effects of the present invention are exhibited. Specifically, the thickness is preferably 20 μm to 200 μm, and more preferably 30 μm to 100 μm. With the thickness in the above range, the first optical compensation layer can function as a protective layer of the first polarizer due to excellent mechanical strength.

As described above, the first optical compensation layer includes a retardation film (A) which contains a polyvinyl acetal-based resin and whose in-plane retardation value (Re[750]) at a wavelength of 750 nm is larger than an in-plane retardation value (Re[550]) at a wavelength of 550 nm.

The absolute value of the photoelastic coefficient of the retardation film (A) is preferably $40 \times 10^{-12}$ (m²/N) or less, more preferably $1 \times 10^{-12}$ to $40 \times 10^{-12}$ (m²/N), particularly preferably $3\times10^{-12}$ to $30\times10^{-12}$ (m²/N), and most preferably $5\times10^{-12}$ to $25\times10^{-12}$ (m²/N). Conventionally, a retardation film that exhibits reverse wavelength dispersion property and has a small absolute value of a photoelastic coefficient has not been obtained. However, according to the present invention, by using a polyvinyl acetal-based resin, a retardation film that exhibits reverse wavelength dispersion property and has a small absolute value of a photoelastic coefficient can be obtained.

Preferably, the polyvinyl acetal-based resin includes a repeating unit represented by the following general formula (I)

[Chemical Formula 2]

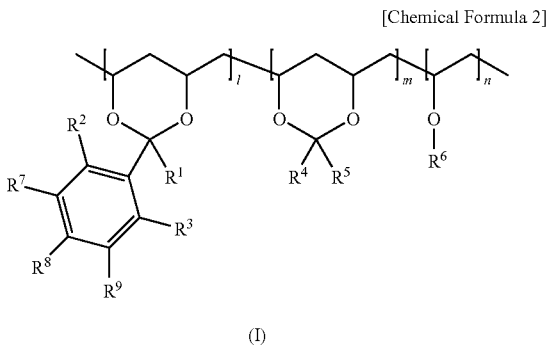

(I)

In the formula (I), $R^1$, $R^4$, and $R^5$ independently represent a hydrogen atom, a straight-chain or branched-chain alkyl group containing 1 to 8 carbon atoms, a cycloalkyl group containing 5 to 10 carbon atoms, a phenyl group, a naphthyl group, a hetero-ring group, an anthranyl group, or a phenanthrenyl group. The cycloalkyl group, the phenyl group, the naphthyl group, the hetero-ring group, the anthranyl group, and the phenanthrenyl group may respectively have a substituent. $R^2$, $R^3$, $R^7$, $R^8$, and $R^9$ independently represent a hydrogen atom, a straight-chain or branched-chain alkyl group containing 1 to 4 carbon atoms, a straight-chain or branched-chain alkoxyl group containing 1 to 4 carbon atoms, an alkoxycarbonyl group, an acyloxy group, a halogen atom, a halogenated alkyl group, a nitro group, an amino group, an azido group, a hydroxyl group, a cyano group, or a thiol group, provided that $R^2$ and $R^3$ are not hydrogen atoms simultaneously. $R^6$ represents a hydrogen atom, a straight-chain or branched-chain alkyl group containing 1 to 8 carbon atoms, a benzyl group, a silyl group, a phosphate group, an acyl group, a benzoyl group, or a sulfonyl group. Two groups adjacent to each other, selected from $R^2$, $R^3$, $R^7$, $R^8$, and $R^9$ may form a benzene ring and as a result, a naphthyl ring may be formed. The naphthyl ring may have, as a substituent, a halogen atom, a straight-chain or branched-chain alkyl group containing 1 to 4 carbon atoms, a straight-chain or branched-chain halogenated alkyl group containing 1 to 4 carbon atoms, a straight-chain or branched-chain alkoxy group containing 1 to 4 carbon atoms, an alkoxycarbonyl group, an acyloxy group, an amino group, an azido group, a nitro group, a cyano group, or a hydroxyl group. l, m, and n represent an integer of 2 or more.

The polyvinyl acetal-based resin can be obtained by conducting a condensation reaction (also referred to acetalization) between a polyvinyl alcohol-based resin, and two or more aldehydes, two or more ketones or at least one aldehyde and at least one ketone.

The acetalization includes a reaction between a polyvinyl alcohol-based resin, and an aldehyde or a ketone in the presence of a strong inorganic acid catalyst or a strong organic acid catalyst. Specific examples of an acid catalyst include hydrochloric acid, sulfuric acid, phosphoric acid, and p-toluenesulfonic acid. A reaction temperature in acetalization is typically higher than 0° C. and a boiling point of a solvent to be used or lower, preferably 10° C. to 100° C., and more preferably 20° C. to 80° C. A reaction temperature within the above ranges can provide a polyvinyl acetal-based resin at high yield. Specific examples of the solvent to be used in acetalization include: alcohols such as methanol, ethanol, propanol, and butanol; cyclic ethers such as 4-dioxane; and aprotic solvents such as N,N-dimethylformamide, N-methylpyrrolidone, and dimethylsulfoxide. The solvent may be used alone or in combination. Further, water and the above-mentioned solvent may be mixed for use.

In the general formula (I), the substituents $R^2$, $R^3$, $R^7$, $R^8$ and $R^9$ are typically used for controlling conformation of a benzene ring and a naphthyl ring to which the substituents are bonded. To be specific, in stretching a polymer film containing the above-described polyvinyl acetal-based resin, the substituents may be easily conformed between two oxygen atoms in the general formula (I) owing to steric hindrance. As a result, a planar structure of the benzene ring and the naphthyl ring may be aligned substantially perpendicular to a virtual line connecting the two oxygen atoms. The wavelength dispersion property of the first optical compensation layer in the present invention is presumably obtained owing to interaction between wavelength dispersion property of the benzene ring and the naphthyl ring aligned substantially perpendicular to the virtual line connecting the two oxygen atoms and wavelength dispersion property of a main chain structure.

The substituents $R^1$, $R^2$, $R^3$, $R^7$, $R^8$ and $R^9$ in the general formula (I) may each be selected appropriately in accordance with the kind of aldehyde (typically, benzaldehydes or 1-naphthaldehydes) or ketone (typically, acetophenones, benzophenones or 1-naphthones) to react with the polyvinyl alcohol-based resin for obtaining the polyacetal-based resin. For example, an aldehyde may be used for incorporating a hydrogen atom into $R^1$, and a ketone may be used for incorporating a substituent other than the hydrogen atom into $R^1$.

Specific examples of benzaldehydes include: 2-methylbenzaldehyde; 2-chlorobenzaldehyde; 2-nitrobenzaldehyde; 2-ethoxybenzaldehyde; 2-(trifluoromethyl)benzaldehyde; 2,4-dichlorobenzaldehyde; 2,4-dihydroxybenzaldehyde; sodium 2,4-disulfobenzaldehyde; disodium o-sulfobenzaldehyde; p-dimethylaminobenzaldehyde; 2,6-dimethylbenzaldehyde; 2,6-dichlorobenzaldehyde; 2,6-dimethoxybenzaldehyde; 2,4,6-trimethylbenzaldehyde (mesitaldehyde); 2,4,6-triethylbenzaldehyde; and 2,4,6-trichlorobenzaldehyde. Specific examples of 1-naphthaldehydes include: 2-methoxy-1-naphthaldehyde, 2-ethoxy-1-naphthaldehyde, 2-propoxy-1-naphthaldehyde, 2-methyl-1-naphthaldehyde and 2-hydroxy-1-naphthaldehyde. Specific examples of acetophenones include: 2-methylacetophenone; 2-aminoacetophenone; 2-chloroacetophenone; 2-nitroacetophenone; 2-hydroxyacetophenone; 2,4-dimethylacetophenone; 4'-phenoxy-2,2-dichloroacetophenone; and 2-bromo-4'-chloroacetophenone. Examples of benzophenones include: 2-methylbenzophenone; 2-aminobenzophenone; 2-hydroxybenzophenone; 4-nitrobenzophenone; 2,4'-dichlorobenzophenone; 2,4'-dihydroxybenzophenone; 4,4'-dichlorobenzophenone; 4,4'-dihydroxybenzophenone; 2-hydroxy-4-methoxybenzophenone; and 2-chloro-4'-dichlorobenzophenone. Specific examples of 1-naphthones include: 2-hydroxy-1-acetonaphthone and 8'-hydroxy-1'-benzonaphthone. Further examples of aldehyde and ketone include: 2-naphthaldehyde having a substituent; 9-anthraldehyde; 9-anthraldehyde having a substituent; acetonaphthone; fluorene-9-aldehyde; and 2,4,7-trinitrofluoren-9-one. The aldehyde or the ketone may be used alone or in combination. The aldehyde or the ketone may be subjected to appropriate modification for use.

$R^1$ in the general formula (I) represents preferably a hydrogen atom or a methyl group, and more preferably a hydrogen atom.

In the case where a moiety having $R^1$ in the general formula (I) does not have a naphthyl ring, $R^2$ and $R^3$ in the general formula (I) each independently represent preferably a methyl group, an ethyl group, a halogen atom, or a halogenated alkyl group, and more preferably a methyl group. In the case where a moiety having $R^1$ in the general formula (I) does not have a naphthyl ring, $R^7$ and $R^9$ are preferably a hydrogen atom, $R^8$ is preferably a hydrogen atom, a methyl group, an ethyl group, a halogen atom, or a halogenated alkyl group, and more preferably a methyl group. That is, the polyvinyl acetal-based resin especially preferably includes a repeating unit represented by the following general formula (II). By incorporating such substituents, a first optical compensation layer satisfying the above optical properties can be obtained.

[Chemical Formula 3]

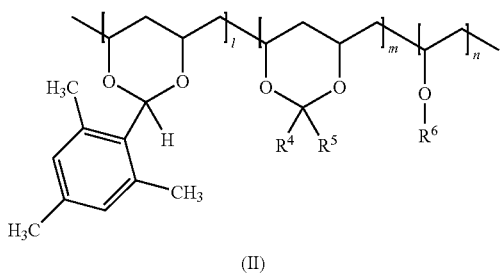

(II)

In the case where a moiety having $R^1$ in the general formula (I) has a naphthyl ring, the naphthyl ring preferably has no substituent other than $R^2$. $R^2$ is preferably a straight or branched alkyl group having 1 to 4 carbon atoms, a straight or branched alkoxy group having 1 to 4 carbon atoms, an alkoxy carbonyl group, an acyloxy group, a halogen atom, a nitro group, an amino group, an azido group, a hydroxyl group or a cyano group, and more preferably an alkoxy group having one carbon atom (a methoxy group). Preferably, $R^3$ and $R^9$ form a benzene ring and as a result, the naphthyl ring is formed. That is, the polyvinyl acetal-based resin preferably includes a repeating unit represented by the following general formula (III). By incorporating such substituents, a first optical compensation layer satisfying the above optical properties can be obtained.

[Chemical Formula 4]

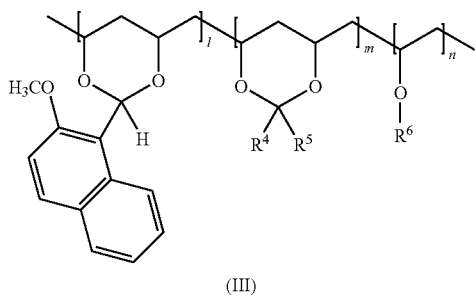

(III)

The polyvinyl alcohol-based resin to be used as a raw material of the polyvinyl acetal-based resin may be obtained by, for example: saponifying a vinyl ester-based polymer obtained through polymerization of a vinyl ester-based monomer; and converting vinyl ester units into vinyl alcohol units. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate. Of those, vinyl acetate is preferred.

An appropriate average degree of polymerization may be employed as an average degree of polymerization of the polyvinyl alcohol-based resin. The average degree of polymerization of the polyvinyl alcohol-based resin is preferably 800 to 3,600, more preferably 1,000 to 3,200, and most preferably 1,500 to 3,000. The average degree of polymerization of the polyvinyl alcohol-based resin can be determined through a method in accordance with JIS K6726 (:1994).

A degree of acetalization of the polyvinyl acetal-based resin is preferably 40 mol % to 99 mol %, more preferably 50 mol % to 95 mol %, and most preferably 60 mol % to 90 mol %. A degree of acetalization within the above ranges can provide a polymer film having excellent transparency by an extrusion method. As a result, the polymer film is stretched to thereby provide a first optical compensation layer satisfying the above-described optical properties. The degree of acetalization refers to a ratio of vinyl alcohol units actually acetalized to vinyl alcohol units which may be converted into acetal units through acetalization. The degree of acetalization of the polyvinyl alcohol-based resin can be determined from a nuclear magnetic resonance spectrum ($^1$H-NMR).

In the general formula (I), substituents $R^4$ and $R^5$ are typically used for finely controlling the wavelength dispersion property of the first optical compensation layer. To be specific, the substituents $R^4$ and $R^5$ are introduced, to thereby align the substituents substantially parallel to a stretching direction of the polymer film when the polymer film containing the polyvinyl acetal-based resin including a structure represented by the above general formula (I) is stretched. The wavelength dispersion property of the first optical compensation layer in the present invention is presumably obtained from interaction between the wavelength dispersion property of the benzene ring aligned substantially perpendicular to the virtual line connecting two oxygen atoms, and the wavelength dispersion property of the main chain structure described above, and the wavelength dispersion property of the substituents $R^4$ and $R^5$. Further, the formability, stretchability, stability of retardation values, and orientation property by being stretched of the polymer film may be further improved.

$R^4$ and $R^5$ may each be selected appropriately in accordance with the kind of aldehyde (typically, acetoaldehyde or benzaldehydes) or ketone (typically, acetophenones or benzophenones) to react with the polyvinyl alcohol-based resin, for example. Specific examples of aldehyde and ketone are the same as those described above.

$R^5$ is preferably a hydrogen atom or a methyl group, and more preferably a hydrogen atom. In the case where a moiety having $R^1$ in the general formula (I) does not have a naphthyl ring, $R^4$ is preferably a methyl group or an ethyl group, and more preferably an ethyl group. In the case where a moiety having $R^1$ in the general formula (I) has a naphthyl ring, $R^4$ is preferably a hydrogen atom. Such substituents are introduced, to thereby provide a polymer film having extremely excellent formability, stretchability, stability of retardation values, and orientation property by being stretched.

In the general formula (I), the substituent $R^6$ is used for protection (end cap treatment) of remaining hydroxyl groups, to thereby adjust a water absorption to an appropriate value and enhance flowability of the molten resin, formability, and stability of retardation values. Thus, the position of $R^6$ may not be subjected to the end cap treatment depending on the desired water absorption or optical properties of the obtained polymer film, and the use of the polymer film (that is, $R^6$ may be a hydrogen atom).

$R^6$ may be obtained as follows: obtaining a polyvinyl acetal-based resin having hydroxyl groups remained and then subjecting the polyvinyl acetal-based resin to the end cap treatment using any appropriate group (typically, a protective group) which may react with a hydroxyl group to form a substituent. Specific examples of the protective group include: a benzyl group; a 4-methoxyphenylmethyl group; a methoxymethyl group; a trimethylsilyl group; a triethylsilyl group; a t-butyldimethylsilyl group; an acetyl group; a benzoyl group; a methanesulfonyl group; and bis-4-nitrophenylphosphite. Any appropriate reaction conditions may be employed for the end cap treatment in accordance with the kind of substituent to react with a hydroxyl group. For example, reactions such as alkylation, benzylation, silylation, phosphorylation, and sulfonylations each involve stirring a polyvinyl acetal-based resin having hydroxyl groups remained and a chloride of a target substituent in the presence of a catalyst 0such as 4-(N,N-dimethylamino)pyridine at 25° C. to 100° C. for 1 hour to 20 hours. $R^6$ is preferably a silyl group selected from a trimethylsilyl group, a triethylsilyl group and a t-butylmethylsilyl group. Such a substituent is used, to thereby provide a first optical compensation layer having high transparency and excellent stability of retardation values even in an environment of high temperature and high humidity or the like.

In the general formula (I), a ratio among l, m, and n may be selected appropriately in accordance with the kinds of substituents and the purpose. l is preferably 5 to 30 mol %, more preferably 10 to 28 mol %, and particularly preferably 15 to 25 mol %, with respect to the total of l, m, and n as 100 mol %. m is preferably 20 to 80 mol %, more preferably 30 to 75 mol %, and particularly preferably 40 to 70 mol %. n is preferably 1 to 70 mol %, more preferably 1 to 50 mol %, and particularly preferably 10 to 40 mol %. A ratio among l, m, and n within the above ranges can provide a polymer film exhibiting reverse wavelength dispersion property and having extremely excellent formability, stretchability, stability or retardation values, and orientation property by being stretched.

The glass transition temperature (Tg) of the polyvinyl acetal-based resin is preferably 90° C. to 185° C., more preferably 90° C. to 150° C., and most preferably 100° C. to 140° C. The glass transition temperature (Tg) can be obtained by a DSC method in accordance with JIS K 7121 (:1987).

The above-mentioned retardation film (A) can contain any appropriate additive depending upon the purpose. Specific examples of the additive include a plasticizer, a heat stabilizer, a light stabilizer, a lubricant, an antioxidant, a UV absorber, a flame retardant, a colorant, an antistatic agent, a compatibilizer, a cross-linking agent, a thickener, and a retardation adjuster. The kind and amount of an additive to be used can be appropriately selected depending upon the purpose. The content of the additive is, for example, preferably 0.01 to 20 parts by weight, more preferably 0.05 to 10 parts by weight, and most preferably 0.1 to 5 parts by weight with respect to 100 parts by weight of the polyvinyl acetal-based resin. Further, the retardation film (A) can contain any appropriate thermoplastic resin in a range satisfying the purpose of the present invention.

The retardation film (A) can further contain any appropriate liquid crystal compound. In the specification of the present invention, the term "liquid crystal compound" refers to a molecule having a mesogenic group in a molecular structure and exhibiting a liquid crystal phase through temperature change such as heating or cooling or through an action of a solvent in a certain amount. The term "mesogenic group" refers to a structural part required for exhibiting a liquid crystal phase and generally includes a ring unit. Specific examples of the mesogenic group include a biphenyl group, a phenylbenzoate group, a phenylcyclohexane group, an azoxybenzene group, an azomethine group, an azobenzene group, a phenylpyrimidine group, a diphenylacetylene group, a diphenylbenzoate group, a bicyclohexane group, a cyclohexylbenzene group, and a terphenyl group. Of those, a mesogenic group having a biphenyl group or a phenylbenzoate group is preferably used. Note that the terminals of each of those ring units may have a substituent such as a cyano group, an alkyl group, an alkoxy group, or a halogen group, for example.

The content of the liquid crystal compound is preferably more than 0 to 20 parts by weight, more preferably 1 to 15 parts by weight, and particularly preferably 2 to 10 parts by weight with respect to 100 parts by weight of a polyvinyl acetal-based resin. A polymer film contains a liquid crystal compound in the above range, whereby the polymer film becomes excellent in transparency and has a large retardation value when stretched. Consequently, a first optical compensation layer capable of satisfying the above-mentioned thickness can be obtained.

The liquid crystal compound may include thermotropic liquid crystals exhibiting a liquid crystal phase in accordance with temperature change or lyotropic liquid crystals exhibiting a liquid crystal phase in accordance with a concentration of a solute in a solution. The thermotropic liquid crystals include enantiotropic liquid crystals in which a phase transition from a crystal phase (or glass state) to a liquid crystal phase is reversible, and monotropic liquid crystals in which a liquid crystal phase develops only during temperature decrease. The liquid crystal compound is preferably thermotropic liquid crystals because of excellent formability, operability, and quality of the film.

The liquid crystal compound may be a polymer substance (polymer liquid crystals) having a mesogenic group on a main chain and/or a side chain, or a low molecular weight substance (low molecular weight liquid crystals) having a mesogenic group in a part of a molecular structure. The liquid crystal compound is preferably a low molecular weight liquid crystal. Because the low molecular weight liquid crystal has excellent compatibility with the polyvinylacetal-based resins, it is possible to obtain a polymer film with high transparency.

The low-molecular liquid crystal preferably has at least one mesogenic group and polymerizable functional group respectively in a part of a molecular structure. More preferably, the low-molecular liquid crystal has at least one mesogenic group and two or more polymerizable functional groups in a part of a molecular structure. This is because a polymer film which has excellent alignment property and has very high optical uniformity and transparency is obtained. As the polymerizable functional group, any suitable functional group can be selected. Examples of the functional group include an acryloyl group, a methacryloyl group, an epoxy group, and a vinyl ether group. Of those, the acryloyl group and the methacryloyl group are preferably used. This is because they have excellent reactivity, and enable a polymer film with high transparency to be obtained. Further, if the polymerizable functional group is cross-linked by polymerization reaction, a polymer film with enhanced mechanical strength and excellent durability and dimentional stability can be obtained.

Specific examples of the low-molecular liquid crystal having at least one mesogenic group and two or more polymerizable functional groups in a part of a molecular structure include "Paliocolor LC242" (trade name) manufactured by BASF, and "CB483" (trade name) manufactured by HUNTSMAN.

(Method of Forming Retardation Film (A))

The above-mentioned retardation film (A) is preferably produced by stretching a polymer film containing the polyvinyl acetal-based resin, and orientating a main chain and a side chain in the polyvinyl acetal-based resin.

As a method of obtaining a polymer film containing the polyvinyl acetal-based resin, a solvent casting method is preferably used. Specifically, the solvent casting method is a method of obtaining a polymer film by: dissolving a resin or the like in a solvent to prepare a solution, flow-casting the solution in a sheet shape on the surface of a substrate, and evaporating the solvent. By adopting such a production method, a polymer film having satisfactory smoothness and optical uniformity (e.g., a film whose retardation value is uniform both in a plane and a thickness direction) is obtained, and the polymer film can also have excellent cost efficiency and mass productivity.

Any appropriate solvent can be employed as the solvent. The solvent preferably contains at least one selected from toluene, ethyl acetate, methylisobutyl ketone, methylethyl ketone, cyclopentanone, and cyclohexanone. More preferably, the solvent contains at least one selected from toluene, ethyl acetate, methylisobutyl ketone, and cyclopentanone. Particularly preferably, the solvent contains at least one selected from toluene, methylisobutyl ketone, and cyclopentanone. Such a solvent can remarkably solve the problem of a restriction of a substrate since the solvent does not cause corrosion that may adversely influence a substrate practically. Further, such a solvent has an appropriately high boiling point, compared with halogenated aliphatic hydrocarbon, so such a solvent has excellent formability, workability, and environmental property.

The solvent can further contain other organic solvents. As the other organic solvents, for example, alcohols, ketones, ethers, esters, aliphatic and aromatic hydrocarbons, and cellosolves are used. In the case where other organic solvents are used, the ratio (X/Y) of a total amount X of the other organic solvents with respect to a total amount Y of the solvent selected from toluene, ethyl acetate, methylisobutyl ketone, methylethyl ketone, cyclopentanone, and cyclohexanone is preferably 6/4 to 1/9 (volume/volume), more preferably 5/5 to 1/9 (volume/volume), and most preferably 4/6 to 1/9 (volume/volume).

The boiling point of the solvent is preferably 60° C. to 160° C., more preferably 70° C. to 150° C., and most preferably 80° C. to 140° C. When the boiling point is in the above range, the solvent does not evaporate rapidly, whereby a polymer film having satisfactory surface evenness can be obtained.

The total solid concentration (typically, a resin and an additive) in the solution is appropriately selected depending upon the solubility, the kind of a coater to be used, and the thickness after coating. The total solid content is generally 5 to 100 parts by weight, preferably 10 to 60 parts by weight, and particularly preferably 10 to 40 parts by weight with respect to 100 parts by weight of the solvent. When the total solid content is in the above range, a polymer film having excellent surface evenness can be obtained.

As a substrate on which the solution is applied, any appropriate material can be selected. Specific examples of the substrate include a glass substrate such as a glass plate and a quartz substrate, a polymer substrate such as a film and a plastic substrate, a metal substrate such as aluminum and iron, an inorganic substrate such as a ceramics substrate, and a semiconductor substrate such as a silicon wafer. Preferably, the substrate is a polymer substrate. This is because the polymer substrate has excellent surface evenness and can be continuously produced with a roll described later, which enables the productivity to be enhanced largely.

The side of the substrate on which a solution is to be applied may be preferably subjected to dry surface treatment such as corona treatment and plasma treatment, wet surface treatment such as the formation of an anchor coat layer, or the like. Further, generally, the substrate is peeled before an obtained polymer film is stretched. For example, in the case where the retardation value of a substrate is very small and therefore adverse influence is not caused practically even if a laminate of a polymer film and a substrate is used as it is in a liquid crystal display apparatus, the substrate may not be peeled.

Figure 3:
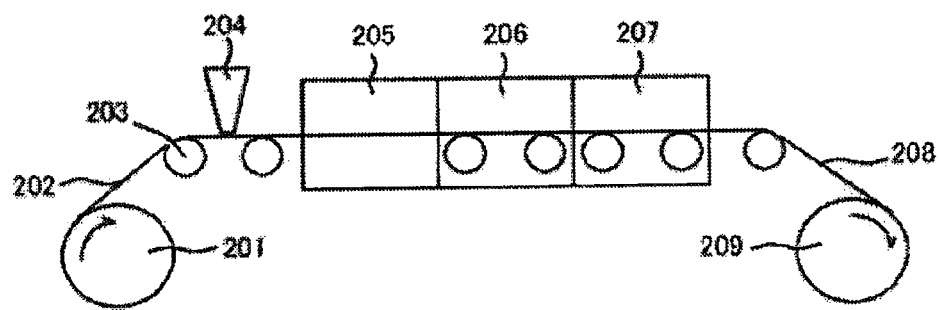
FIG. 3 is a schematic view showing the step of forming a polymer film by a solvent casting method.

An example of a method of producing a polymer film by the solvent casting method will be described with reference to FIG. 3. FIG. 3 is a schematic view showing the step of forming a polymer film by a solvent casting method. In this step, a substrate 202 is supplied from a feed part 201 and transported by a guide roll 203, and a solution in which a resin and the like are dissolved is flow-casted (applied) in a sheet shape onto the surface of the substrate 202 in a coater part 204. The substrate with the resin applied thereto is fed to drying means 205 to 207, and dried while being raised from a low temperature to a high temperature gradually, whereby the solvent is evaporated and a polymer film 208 is formed. The polymer film 208 is wound up by a take-up part 209 for the subsequent stretching step.

As a method of casting (applying) the solution on the surface of the substrate in a sheet shape, any appropriate application method employing a coater maybe selected and used. Specific examples of the coater include a reverse roll coater, a positive rotation roll coater, a gravure coater, a knife coater, a rod coater, a slot orifice coater, a curtain coater, a fountain coater, an air doctor coater, a kiss coater, a dip coater, a bead coater, a blade coater, a cast coater, a spray coater, a spin coater, an extrusion coater, a hot melt coater, and a comma coater. Of those, preferred are a reverse roll coater, a positive rotation roll coater, a gravure coater, a rod coater, a slot orifice coater, a curtain coater, a fountain coater, a spin coater, and a comma coater. The application method employing the coater allows formation of a polymer film having excellent surface evenness.

Examples of means for evaporating the solution (drying method) include: an air-circulating thermostatic oven in which hot air or cool air circulates; a heater using microwaves or far infrared rays; a heated roller for temperature adjustment; and a drying method employing a heat pipe roller or a metallic belt.

The drying temperature is preferably equal to or lower than the glass transition temperature of the resin. For example, the drying temperature is 50° C. to 170° C. The drying temperature is 70° C. to 90° C. in one embodiment, 110° C. to 130° C. in another embodiment, and 140° C. to 160° C. in still another embodiment. A polymer film having high surface evenness can be obtained as long as the drying temperature is in the above temperature range. Further, in the drying step, it is preferred that the resin is dried by raising the temperature from a low temperature to a high temperature gradually. For example, it is preferred to perform drying in stages: 70° C. to 90° C. in the first stage, 110° C. to 130° C. in the second stage, and 140° C. to 160° C. in the third stage.

As the drying time, any appropriate drying time can be adopted. For example, the drying time is 1 to 120 minutes. In one embodiment, the drying time is 10 to 30 minutes in one embodiment, and 50 to 70 minutes in another embodiment. For example, in the case of performing drying in the above-mentioned three stages, it is preferred to set the first stage to be 70° C. to 90° C. for 10 to 30 minutes, the second stage to be 110° C. to 130° C. for 10 to 30 minutes, and the third stage to be 140° C. to 160° C. for 50 to 70 minutes.

As a method of stretching the polymer film obtained as described above, any appropriate stretching method can be adopted depending upon the purpose. Examples of the stretching method include a longitudinal uniaxial stretching method, a transverse uniaxial stretching method, a longitudinal and transverse simultaneous biaxial stretching method, and a longitudinal and transverse sequential biaxial stretching method. As means for stretching the polymer film, any appropriate stretching machine such as a roll stretching machine, a tenter stretching machine, and a biaxial stretching machine can be used. Preferably, the stretching machine has temperature control means. In the case of stretching by heating, the internal temperature of the stretching machine may be changed continuously or in stages. The stretching step may be conducted once or at least twice. The stretching direction may be the longitudinal direction (machine direction: MD) of a film or the width direction (transverse direction: TD) thereof. Further, the polymer film may be stretched in an oblique direction (obliquely stretched), using a stretching method shown in FIG. 1 of JP-A-2003-262721.

The temperature (stretching temperature) at which the polymer film is stretched can be appropriately set depending upon the purpose. Preferably, stretching is performed, with respect to the glass transition temperature (Tg) of the polymer film, in a range of Tg+1° C. to Tg+30° C. By selecting such conditions, a retardation value is likely to be uniform, and a retardation film is unlikely to be crystallized (opaque). Specifically, the stretching temperature is preferably 100° C. to 180° C., and more preferably 120° C. to 160° C. The glass transition temperature can be obtained by a DSC method in accordance with JIS K 7121 (1987).

Any appropriate method may be employed as a method of controlling the stretch temperature. Examples of the temperature control method include: an air-circulating thermostatic oven in which hot air or cool air circulates; a heater using microwaves or far infrared rays; a heated roller for temperature adjustment; a heat pipe roller; and a metallic belt.

A magnification (stretching ratio) by which the polymer film is stretched can be appropriately selected depending upon the purpose. The stretching ratio preferably exceeds 1 and is 3 times or less, more preferably exceeds 1 and is 2.5 times or less, and particularly preferably 1.1 to 2.0 times. Further, although there is no particular limit, the feed speed during stretching is preferably 0.5 m/min. to 30 m/min. in terms of the mechanical precision, stability, and the like. Under the above stretching conditions, intended optical properties can be obtained, and a retardation film having excellent uniformity can be obtained.

B-3. Second Optical Compensation Layer and Third Optical Compensation Layer

Each of the second optical compensation layer and the third optical compensation layer is negative uniaxial optical element (c) having a refractive index profile of nx=ny>nz. The second optical compensation layer and the third optical compensation layer are placed between the first optical compensation layer and the second polarizer so as to optically compensate for the birefringence of a liquid crystal layer in a liquid crystal cell.

In the liquid crystal panel of the present invention, as shown in FIGS. 1(a) and 1(b), the negative uniaxial optical element (c) may be placed on one side of the liquid crystal cell (i.e., a second optical compensation layer 40), and as shown in FIG. 1(c), the negative uniaxial optical element (c) may be placed on both sides of the liquid crystal cell (i.e., a second optical compensation layer 40 and a third optical compensation layer 40').

The negative uniaxial optical element (c) ideally has an optical axis in a normal direction. $Re[550]_2$ in the negative uniaxial optical element (c) is preferably less than 10 nm, and more preferably 5 nm or less.

As $Rth[550]_2$ of the second optical compensation layer, any appropriate value can be selected depending upon the $Rth[550]_{LC}$ of the liquid crystal layer. In the case where the liquid crystal panel of the present invention includes only one negative uniaxial optical element (c) (e.g., in the case of the configuration shown in FIG. 1(a) or 1(b)), $Rth[550]_2$ of the second optical compensation layer is preferably 80 nm to 280 nm, more preferably 100 nm to 260 nm, particularly preferably 120 nm to 240 nm, and most preferably 140 nm to 220 nm.

In the case where the liquid crystal panel of the present invention includes two negative uniaxial optical elements (c) (e.g., in the case of the configuration shown in FIG. 1(c)), $Rth[550]_2$ of the second optical compensation layer and Rth $[550]_3$ of the third optical compensation layer are set so that their total ($Rth[550]_2+Rth[550]_3$) optically compensates for $Rth[550]_{LC}$ of the liquid crystal layer. $Rth[550]_2+Rth[550]_3$ is preferably 80 nm to 280 nm, more preferably 100 nm to 260 nm, particularly preferably 120 nm to 240 nm, and most preferably 140 nm to 220 nm. $Rth[550]_2$ of the second optical compensation layer and Rth $[550]_3$ the third optical compensation layer may be the same or different.

As the thickness of the second optical compensation layer and the thickness of the third optical compensation layer, appropriate thicknesses are respectively adopted as long as the effects of the present invention can be obtained. Specifically, the thicknesses are preferably 2 µm to 200 µm, respectively. When the thicknesses are in this range, the optical compensation layers have excellent mechanical strength. Therefore, for example, in the case of a liquid crystal panel having the configuration shown in FIG. 1(c), the third optical compensation layer can function as a protective layer of the second polarizer.

As retardation films used in the second optical compensation layer and the third optical compensation layer, any appropriate films can be adopted respectively as long as they satisfy the above-mentioned optical properties. It is preferred that the retardation film is formed of a material having excellent transparency, mechanical strength, heat stability, and a water shielding property.

Preferably, each of the second optical compensation layer and the third optical compensation layer includes a retardation film mainly containing a thermoplastic resin. The retardation film may be stretched or may not be stretched. The second optical compensation layer and the third optical compensation layer may be the same or different.

Examples of the thermoplastic resin include: general purpose plastics such as a polyolefin resin, a cycloolefin-based resin, a polyvinyl chloride-based rein, a cellulose-based resin, a styrene-based resin, an acrylonitrile/butadiene/styrene-based resin, an acrylonitrile/styrene-based resin, polymethyl methacrylate, polyvinyl acetate, and a polyvinylidene chloride-based resin; general purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; and super engineering plastics such as a polyphenylene sulfide-based resin, a polysulfone-based resin, a polyether sulfone-based resin, a polyether ether ketone-based resin, a polyallylate-based resin, a liquid crystalline resin, a polyamideimide-based resin, a polyimide-based resin, and a polytetrafluoroethylene-based resin. The thermoplastic resins may be used alone or in combination. In addition, the thermoplastic resins can be used after any appropriate polymer modification. Examples of the polymer modification include copolymerization, crosslinking, molecular-terminal modification, and stereoregularity modification.

Preferably, the second optical compensation layer and/or the third optical compensation layer include a retardation film (B) containing a polyimide-based resin. The retardation film (B) exhibits characteristics in which a retardation value measured with light having a longer wavelength is smaller than a retardation value measured with light having a shorter wavelength (which may also be referred to as positive wavelength dispersion property). Therefore, by using the retardation film (B) together with the retardation film (A), a liquid crystal panel having a large difference (ΔD) of a wavelength dispersion value between the first optical compensation layer and the second optical compensation layer can be obtained. Such a liquid crystal panel is useful for improving the display characteristics of a liquid crystal display apparatus.

Preferably, the polyimide-based resin has a hexafluoroisopropylidene group and/or a trifluoromethyl group. More preferably, the polyimide-based resin includes a repeating unit represented by the following general formula (IV) or a repeating unit represented by the following general formula (V). The polyimide-based resin including these repeating units has excellent transparency, solubility with respect to a general-purpose solvent, large birefringence in thickness direction, and sharp positive wavelength dispersion property.

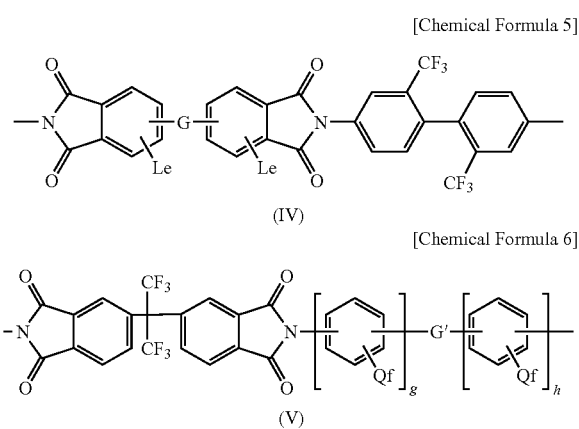

[Chemical Formula 5]

(IV)

[Chemical Formula 6]

(V)

In the above general formulae (IV) and (V), G and G' represent groups independently selected from a covalent bond, a CH$_2$ group, a C(CH$_3$)$_2$ group, a C(CF$_3$)$_2$ group, a C(CX$_3$)$_2$ group (herein, X is halogen), a CO group, an O atom, an S atom, a SO$_2$ group, a Si(CH$_2$CH$_3$)$_2$ group, and a N(CH$_3$) group, and they may be the same or different.

In the above general formula (IV), L represents a substituent, and e represents a substitution number thereof. L is, for example, halogen, an alkyl group containing 1 to 3 carbon atoms, a halogenated alkyl group containing 1 to 3 carbon atoms, a phenyl group, or a substituted phenyl group. In the case where L represents plural substituents, they may be the same or different. e represents an integer of 0 to 3.

In the above general formula (V), Q represents a substituent, and f represents a substitution number thereof. Q is, for example, an atom or a group selected from hydrogen, halogen, an alkyl group, a substituted alkyl group, a nitro group, a cyano group, a thioalkyl group, an alkoxy group, an aryl group, a substituted aryl group, an alkylester group, and a substituted alkylester group. In the case where Q represents plural substituents, they may be the same or different. f is an integer from 0 to 4, and each of g and h is an integer of 1 to 3.

The polyimide-based resin can be obtained, for example, by the reaction between tetracarboxylic dianhydride and diamine. The repeating unit in the general formula (IV) can be obtained, for example, by using 2,2'-bis(trifluoromethyl)-4, 4'-diaminobiphenyl as diamine, and reacting it with tetracarboxylic dianhydride having at least two aromatic rings. The repeating unit in the general formula (V) can be obtained, for example, by using 2,2-bis(3,4-dicarboxyphenyl)hexafluoropropannic dianhydride as tetracarboxylic dianhydride, and reacting it with diamine having at least two aromatic rings. The reaction may be, for example, chemical imidization that proceeds in two stages or thermal imidization that proceeds in one stage.

Examples of the tetracarboxylic dianhydride include: 2,2'-bis(3,4-dicarboxyphenyl)-hexafluoropropanoic dianhydride; 3,3',4,4'-benzophenonetetracarboxylic dianhydride; 2,3,3',4-benzophenonetetracarboxylic dianhydride; 2,2',3,3'-benzophenonetetracarboxylic dianhydride; 2,2'-dibromo-4,4',5, 5'-biphenyltetracarboxylic dianhydride; 2,2'-bis (trifluoromethyl)-4,4',5,5'-biphenyltetracarboxylic dianhydride; 3,3',4,4'-biphenyltetracarboxylic dianhydride; 4,4'-bis(3,4-dicarboxyphenyl)ether dianhydride; 4,4'-oxydiphthalic dianhydride; 4,4'-bis(3,4-dicarboxyphenyl)sulfonic dianhydride; bis(2,3-dicarboxyphenyl)methane dianhydride; and bis(3,4-dicarboxyphenyl)diethylsilane dianhydride.

Examples of the diamine include: 2,2'-bis(trifluoromethyl)-4,4'-diaminobiphenyl; 4,4'-diaminobiphenyl; 4,4'-diaminophenyl methane; 4,4'-(9-fluorenylidene)-dianiline; 3,3'-dichloro-4,4'-diaminodiphenyl methane; 2,2'-dichloro-4,4'-diaminobiphenyl; 4,4'-diaminodiphenyl ether; 3,4'-diaminodiphenyl ether; 4,4'-diaminodiphenyl sulfone; and 4,4'-diaminodiphenyl thioether.

As the weight average molecular weight (Mw) of the polyimide, the weight average molecular weight (Mw) using polyethylene oxide standard including as a developing solvent a dimethylformamide solution (1 L of a dimethylformamide solution prepared by: adding 10 mM lithium bromide and 10 mM phosphoric acid; and making up to 1 L) is preferably 20,000 to 180,000, more preferably 50,000 to 150,000, and most preferably 70,000 to 130,000. A weight average molecular weight of polyimide within the above ranges can provide a polyimide layer having excellent mechanical strength. Further, a weight average molecular weight thereof within the above ranges can provide an effect of inhibiting change in optical properties of the liquid crystal panel of the present invention even when it is exposed to high temperature and high humidity environment.

Any appropriate imidation rate may be employed as the imidation rate of the polyimide. The imidation rate is preferably 90% or more, more preferably 95% or more, and most preferably 98% or more. The imidation rate can be determined with a nuclear magnetic resonance (NMR) spectrum by using an integrated intensity ratio of a peak of proton derived from polyamic acid, which is a precursor of polyimide, and a peak of proton derived from polyimide.

A retardation film used in the second optical compensation layer and/or third optical compensation layer may be a retardation film using a liquid crystalline composition. In the case where the liquid crystalline composition is used, the second optical compensation layer and/or the third optical compensation layer includes a solidified layer or a cured layer of a liquid crystalline composition containing a calamitic liquid crystal compound aligned in a planar arrangement, or a solidified layer or a cured layer of a liquid crystalline composition containing a discotic liquid crystal aligned in a columnar arrangement. By using these materials, a thinner retardation film can be obtained.

The retardation film made of a solidified layer or a cured layer of a liquid crystalline composition containing the caramitic liquid crystal compound aligned in a planar arrangement can be obtained by a method described in JP-A-2003-287623. Further, the retardation film made of a solidified layer or a cured layer of a liquid crystalline composition containing the discotic liquid crystal compound aligned in a columnar arrangement can be obtained by a method described in JP-A-9-117983.

B-4. Polarizer

In this specification, the polarizer refers to an element capable of converting natural light or polarized light into appropriate polarized light. As the first polarizer 20 and the second polarizer 20', any appropriate polarizer can be adopted depending on the purpose. Preferably, the polarizer converts natural light or polarized light into linearly polarized light. Such a polarizer splits incident light into two perpendicular polarized components, passes one polarized component, and absorbs, reflects, and/or scatters the other polarized component. The thickness of the polarizer is preferably 5 to 50 µm, and more preferably 20 to 40 µm.

The transmittance (herein after, referred to as a single axis transmittance) measured with light having a wavelength of 550 nm at 23° C. of the polarizer is preferably 40% or higher, and more preferably 42% or higher. The theoretical upper limit of the single axis transmittance is 50%, and the upper limit is practically 46%.

The polarization degree measured with light having a wavelength of 550 nm at 23° C. of the polarizer is preferably 99.8% or higher, and more preferably 99.9% or higher. By setting the polarization degree in the above-mentioned range, a liquid crystal display apparatus with a high contrast ratio in a front direction can be obtained. The theoretical upper limit of the above-mentioned polarization degree is 100%.

The hue under the National Bureau of Standards (NBS) of the polarizer, a-value (simplex a-value) is preferably −2.0 or higher, and more preferably −1.8 or higher. The hue under the National Bureau of Standards (NBS) of the polarizer, b-value (simplex b-value) is preferably 4.2 or less, and more preferably 4.0 or less. If the a-value and the b-value of the polarizer are set close to 0, a display apparatus providing a display image with vivid color can be obtained. Thus, the ideal a-value and b-value are 0.

As the polarizer, any appropriate film can be selected. The polarizer is preferably a stretched film mainly containing a polyvinyl alcohol-based resin containing iodine or a dichromatic dye. In this specification, the term "stretched film" refers to a polymer film obtained by applying a tension to an unstretched film at an appropriate temperature and enhancing the orientation of molecules in the tension direction.

The polyvinyl alcohol-based resin to be used may be prepared by saponificating the polymer obtained by polymerizing a vinyl ester-based monomer. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate.

An average degree of polymerization of the polyvinyl alcohol-based resin may be selected appropriately depending on the purpose. The average degree of polymerization is preferably 1,200 to 3,600. The average degree of polymerization can be determined through a method in accordance with JIS K6726-1994.

A degree of saponification of the polyvinyl alcohol-based resin is preferably 95.0 mol % to 99.9 mol %. By setting the degree of saponification within the above-mentioned range, a polarizer having excellent durability can be obtained. The degree of saponification may be determined in accordance with JIS K6726-1994.

The polymer film containing the polyvinyl alcohol-based resin as a main component preferably contains polyvalent alcohol as a plasticizer. This is because the film having further improved chromaticity and stretching property can be obtained. Examples of the polyvalent alcohol include ethylene glycol, glycerin, propylene glycol, diethylene glycol, triethylene glycol, tetraethylene glycol, and trimethylolpropane. The polyvalent alcohol may be used independently, or in combination. A content of the polyvalent alcohol is preferably more than 0 to 30 parts by weight or less with respect to 100 parts by weight of polyvinyl alcohol-based resin.

A polymer film mainly containing the polyvinyl alcohol-based resin can preferably contain a surfactant. This is because the surfactant further enhances the chromaticity and stretching property of a film. The surfactant is preferably a non-ionic surfactant. Examples of the non-ionic surfactant include diethanolamide laurate, coconut oil fatty acid diethanolamide, coconut oil fatty acid monoathanolamide, monoisopropanolamide laurate, and monoisopropanolamide oleate. The content of the surfactant is preferably more than 0 to 5 parts by weight with respect to 100 parts by weight of polyvinyl alcohol resin.

As a method of obtaining a polymer film mainly containing the polyvinyl alcohol-based resin, any appropriate forming method can be adopted. As a specific example of the forming method, there is a method described in Example 1 of JP-A-2000-315144.

As the polymer film mainly containing the above-mentioned polyvinyl alcohol-based resin, a commercially available product can be used as it is. Specific examples of the commercially available product include "Kuraray Vinylone Film" (trade name) manufactured by Kuraray Co., Ltd., "Tohcello Vinylone Film" (trade name) manufactured by Tohcello Co., Ltd., and "Nichigo Vinylone Film" (trade name) manufactured by Nippon Synthetic Chemical Industry, Co., Ltd.

Any appropriate substance may be employed as the dichromatic dye. In this specification, the term "dichroism" refers to optical anisotropy in which light absorption differs in two directions of an optical axis direction and a direction perpendicular thereto. Examples of the dichromatic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

B-5. Other Layers (Protective Film)

On one side or both sides of the polarizer, any appropriate protective film can be placed depending upon the purpose. The protective film is used for the purpose of preventing a polarizer from being shrunk or expanded to adversely influence other constituent members and preventing the polarizer from being degraded with UV rays.

The transparency of the protective film measured with light having a wavelength of 550 nm at 23° C. is preferably 90% or more. The absolute value of a photoelastic coefficient of the protective film measured with light having a wavelength of 550 nm at 23° C. is preferably $1 \times 10^{-12}$ to $60 \times 10^{-12}$ ($m^2/N$).

In the case where the protective film is placed on a liquid crystal cell side of a polarizer, it is preferred that such a protective film substantially exhibits optical isotropy. Herein, "substantially exhibits optical isotropy" includes the case where Re[550] of the protective film is less than 10 nm, and the absolute value of Rth[550] is less than 10 nm. The above Re[550] is preferably 5 nm or less, and the absolute value of Rth[550] is preferably 5 nm or less.

In the case where the protective film is placed on the opposite side of the polarizer with respect to the liquid crystal cell side of a polarizer, such a protective film can be provided with any appropriate surface treatment layer. Examples of the surface treatment include hard coat treatment, reflection prevention treatment, and antiglare treatment.

As the thickness of the protective film, any appropriate thickness can be adopted. Specifically, the thickness is preferably 20 μm to 200 μm, and more preferably 30 μm to 100 μm.

The protective film preferably includes a polymer film containing as a main component at least one resin selected from an acrylic resin, a cellulose-based resin, and a cycloolefin-based resin. In the case where the thermoplastic resin is formed into a sheet through a solvent casting method, for example, molecules align spontaneously during evaporation of a solvent. In the case where the formed film has any in-plane and thickness direction retardation values, a retardation film satisfying a refractive index profile of nx=ny=nz can be obtained with secondary fabrication such as stretching treatment. To be specific, in the case where an optical film having a small refractive index (nz) in a thickness direction is obtained, the optical film may be subjected to stretching or shrinking treatment for increasing nz. In the case where an optical film having a large main in-plane refractive index (nx) is obtained, the optical film may be subjected to a stretching or shrinking treatment for reducing nx. The polymer film containing as a main component the acrylic resin may be produced through a method described in Example 1 of JP-A-2004-198952, for example. The polymer film containing as a main component the cellulose-based resin may be obtained through a method described in Example 1 of JP-A-07-112446, for example. The polymer film containing as a main component the cycloolefin-based resin may be obtained through a method described in JP-A-2001-350017.

The protective film may include a polymer blend film containing as a main component a resin composition containing a thermoplastic resin having a negative intrinsic birefringence value and a thermoplastic resin having a positive intrinsic birefringence value. Any appropriate materials may be used when using such a blend film. An isobutylene/N-methyl maleimide copolymer is preferred as the thermoplastic resin having a negative intrinsic birefringence value, and an acrylonitrile/styrene copolymer is preferred as the thermoplastic resin having a positive intrinsic birefringence value. Such a blend film may or may not be stretched.

As the content of a thermoplastic resin having a negative intrinsic birefringence value in the blend film, an appropriate range is selected depending upon the kind of a resin to be used. The content is preferably 30 parts by weight to 90 parts by weight, more preferably 40 parts by weight to 80 parts by weight, and most preferably 50 parts by weight to 75 parts by weight, with respect to 100 parts by weight of a total solid content of the blend film. The content in the above range can provide a protective film having excellent mechanical strength with a small retardation value.

The blend film shows optical isotropic property and may have the desired optical properties with a single film. In the case where the thermoplastic resins are each formed into a sheet through a solvent casting method, for example, molecules are unlikely to spontaneously align during evaporation of a solvent. Thus, a retardation film satisfying a refractive index profile of nx=ny=nz can be obtained without secondary fabrication such as stretching treatment. Further, the thermoplastic resin hardly exhibits retardation values and thus may be subjected to stretching treatment. The stretching treatment may be performed for any purpose such as further improving mechanical strength or obtaining a wide optical film. The polymer film containing as a main component a resin composition containing the isobutylene/N-methyl maleimide copolymer and the acrylonitrile/styrene copolymer may be obtained through a method described in JP-A-05-59193.

C-1. Liquid Crystal Display Apparatus

Figure 4:
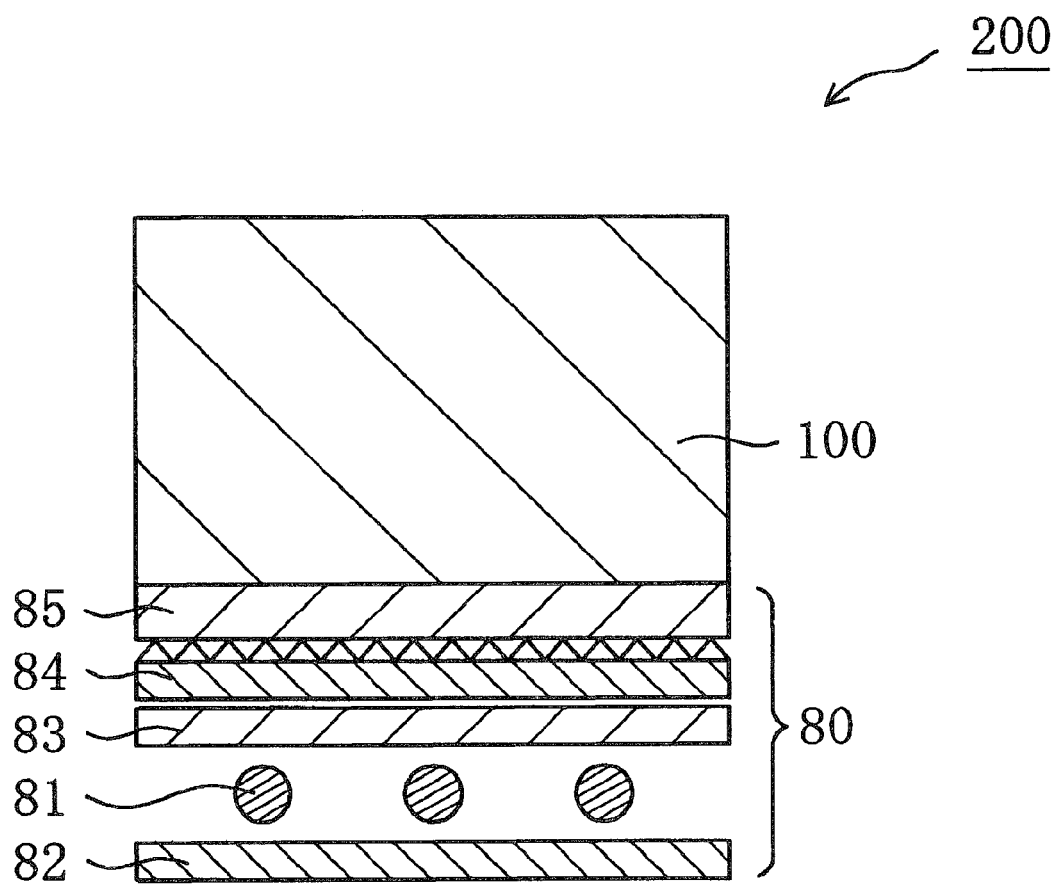
FIG. 4 is a schematic cross-sectional view of a liquid crystal display apparatus according to a preferred embodiment of the present invention.

The liquid crystal display apparatus of the present invention includes the liquid crystal panel. FIG. 4 is a schematic cross-sectional view of a liquid crystal display apparatus according to a preferred embodiment of the present invention. For ease of observation, it should be noted that the ratio of each constituent member in longitudinal, lateral, and thickness directions illustrated in FIG. 4 is different from the actual one. A liquid crystal display apparatus 200 at least includes a liquid crystal panel 100 and a backlight unit 80 placed on one side of the liquid crystal panel 100. In the illustrated example, the case where a backlight unit of a direct-type is adopted has been shown. However, for example, a sidelight-type may be used.

In the case where a direct-type is adopted, the backlight unit 80 preferably includes a light source 81, a reflective film 82, a diffusion plate 83, a prism sheet 84, and a brightness enhancing film 85. In the case where the sidelight-type is adopted, the backlight unit preferably further includes at least a light guide plate and a light reflector, in addition to the above configuration. As long as the effects of the present invention are obtained, a part of the optical member illustrated in FIG. 4 may be omitted or may be replaced by another optical element, depending upon the application such as an illumination system of a liquid crystal display apparatus and a driving mode of a liquid crystal cell.

The liquid crystal display apparatus may be of a transmissive type in which a screen is observed by irradiation of light from a back surface of a liquid crystal panel, or may be of a reflection type in which the screen is observed by irradiation of light from a viewer side of the liquid crystal panel. Alternatively, the liquid crystal display apparatus may be of a semi-transmissive type which has both the properties of the transmissive type and the reflection type.

C-2. Display Characteristics of a Liquid Crystal Display Apparatus

In the liquid crystal display apparatus having a liquid crystal panel of the present invention, the maximum value of $\Delta a^* b^*$ at a polar angle of 60° and an omniazimuth (0° to 360°) in the case where a black image is displayed is preferably 4.0 or less, and more preferably 3.0 or less. The average value of $\Delta a^* b^*$ at a polar angle of 60° and an omniazimuth (0° to 360°) in the case where a black image is displayed in the liquid crystal display apparatus is preferably 2.0 or less, and more preferably 1.8 or less. The difference between the maximum value and the minimum value of $\Delta a^* b^*$ at a polar angle of 60° and an omniazimuth (0° to 360°) in the case where a black image is displayed in the liquid crystal display apparatus is preferably 3.0 or less, more preferably 2.5 or less, and particularly preferably 2.0 or less.

Herein, $\Delta a*b*$ is a value calculated by an expression: $\{(a*)^2+(b*)^2\}^{1/2}$, $(a*,b*)$ is a color coordinate defined by CIE1976L*a*b* color space, and the theoretical lower limit of $\Delta a*b*$ is 0. A smaller lower limit shows that the color shift in an oblique direction on a screen of a liquid crystal display apparatus in which a black image is displayed is smaller.

In the liquid crystal display apparatus, the contrast ratio between a white image and a black image is preferably 100 or more at a polar angle of 70° and a horizontal direction (0°-180° direction). Further, the average value of the contrast ratio at a polar angle of 60° and an omniazimuth (0° to 360°) is preferably 85 or more, and more preferably 95 or more. The maximum value of the contrast ratio at a polar angle of 60° and an omniazimuth (0° to 360°) is preferably 120 or more, and more preferably 150 or more.

Preferably, the liquid crystal display apparatus of the present invention is applied to a television. The screen size of the television is preferably wide 17-type (373 mm×224 mm) or more, more preferably wide 23-type (499 mm×300 mm) or more, and particularly preferably wide 32-type (687 mm×412 mm) or more.

The present invention will be described in more detail by using the following examples. However, the present invention is not limited to the examples. Measurement methods used in the examples are described below.

(1) Method of Determining Single Axis Transmittance, Degree of Polarization, Hue a-value and Hue b-value of Polarizing Plate:

They were determined at 23° C. by using a spectrophotometer "DOT-3" (trade name, manufactured by Murakami Color Research Laboratory).

(2) Method of Determining Molecular Weight:

The molecular weight was calculated through gel permeation chromatography (GPC) by using polystyrene as a standard sample. To be specific, the molecular weight was determined under the following measurement conditions by using the following apparatus and instruments. The measurement sample was obtained by dissolving a polymer in tetrahydrofuran to prepare 0.1 wt % solution, standing the solution overnight, and filtering the solution with 0.45 μm membrane filter.

Analyzer: "HLC-8120GPC", manufactured by Tosoh Corporation
Column: TSKgel SuperHM-H/H4000/H3000/H2000
Column size: 6.0 mmI.D.×150 mm
Eluant: tetrahydrofuran
Flow rate: 0.6 ml/minute
Detector: RI
Column temperature: 40° C.
Injection amount: 20 μl (3) Method of Measuring Thickness:

In the case where a thickness was less than 10 μm, it was measured by using a thin film thickness spectrophotometer "Multichannel photodetector MCPD-2000" (trade name, manufactured by Otsuka Electronics Co., Ltd.). In the case where a thickness was 10 μm or more, it was measured by using a digital micrometer "KC-351C-type" (trade name, manufactured by Anritsu Corporation).

(4) Method of Measuring Average Refractive Index of Film:

The average refractive index of the film was determined by measuring refractive indices by using an Abbe refractometer "DR-M4" (trade name, manufactured by Atago Co., Ltd.) by using light of a wavelength of 589 nm at 23° C.

(5) Method of Determining Retardation Values (Re[λ], R40[λ], Rth[λ]):

The retardation values were determined by using an automatic birefringence analyzer "KOBRA-21ADH" (trade name, manufactured by Oji Scientific Instruments) by using light of a wavelength of λ nm at 23° C. Rth may also be calculated using refractive indices nx, ny, and nz, which can be obtained by computational numerical calculation using an in-plane retardation value (Re) determined at each wavelength at 23° C., a retardation value (R40) determined by inclining a slow axis by 40° as a tilt angle, a thickness (d) of a retardation film, and an average refractive index (n0) of the retardation layer.

(6) Method of Measuring Transmittance:

The transmittance was measured by using a UV-vis spectrophotometer "V-560" (trade name, manufactured by JASCO Corporation) by using light of a wavelength of λ nm at 23° C.

(7) Method of Determining Absolute Value C[590] of Photoelastic Coefficient:

The retardation values (23° C./wavelength of 590 nm) at a center of a sample having a size of 2 cm×10 cm were determined under stress (5 to 15 N) by using a spectroscopic ellipsometer "M-220" (trade name, manufactured by JASCO Corporation) while both ends of the sample were held, and the photoelastic coefficient was calculated from a slope of a function of the stress and the retardation values.

(8) Method of Determining Contrast Ratio of Liquid Crystal Display Apparatus:

After backlight was turned on in a dark room at 23° C. for 30 minutes, measurement of a contrast ratio was performed by using the following method and measurement apparatus. A white image and a black image were displayed on a liquid crystal display apparatus, and Y values of an XYZ display system were measured by using "EZ Contrast 160D" (trade name, manufactured by ELDIM SA). A contrast ratio "YW/YB" in an oblique direction was calculated from a Y value (YW) of the white image and a Y value (YB) of the black image. Note that, an azimuth angle of 0° refers to a longer side of the panel. The polar angle of 0° refers to a normal line direction of the panel.

(9) Method of Measuring Color Shift ($\Delta a*b*$) of Liquid Crystal Display Apparatus:

After backlight was turned on in a dark room at 23° C. for 30 minutes, measurement of color shift was performed by using the following method and measurement apparatus. A black image was displayed on a liquid crystal display apparatus, and color coordinates a* and b* defined in a CIE1976 L*a*b* color space were measured at an azimuth angle of 0 to 360° and a polar angle 60° by using "EZ Contrast 160D" (trade name, manufactured by ELDIM SA). A color shift in an oblique direction ($\Delta a* b*$) was calculated from an expression: $\{(a*)^2+(b*)^2\}^{1/2}$.

REFERENCE EXAMPLE 1

Synthesis of Polyvinyl Acetal-based Resin 5.0 g of a polyvinyl alcohol-based resin "NH-18" (trade name, available from Nippon Synthetic Chemical Industry Co., Ltd., degree of polymerization: 1,800, degree of saponification: 99.0%) was dried at 105° C. for 2 hours and then dissolved in 95 ml of dimethylsulfoxide (DMSO). 2.02 g of 2,4,6-trimethylbenzaldehyde (mesitaldehyde) and 0.44 g of p-toluenesulfonic acid monohydrate were added to the solution, and the whole was stirred at 40° C. for 2 hours. 13.41 g of 1,1-diethoxyethane (acetal obtained by using acetoaldehyde as a starting material) was added thereto, and the whole was stirred at 40° C. for additional 2 hours. Then, 1.18 g of triethylamine was added thereto, to thereby complete the reaction. The obtained reaction product (polymer) was added dropwise into methanol for reprecipitation. After settling of the polymer, a supernatant was removed through decantation, and a methanol/water solution (1/1 in v/v) was added to the polymer, to thereby reprecipitate the polymer for washing. The polymer obtained through filtration was dried, to thereby obtain 7.50 g of white polymer.

$^1$H-NMR measurement confirmed that the white polymer was a polyvinyl acetal-based resin having a structure represented by the following formula (VI).

[Chemical Formula 7]

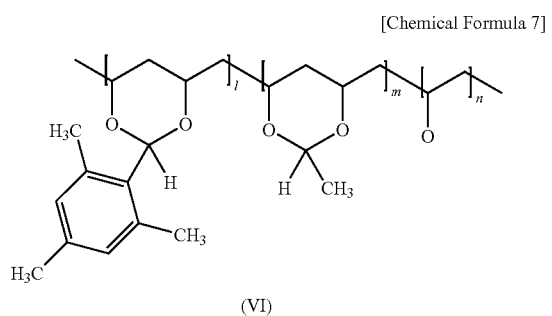

(VI)

In the formula (VI), l:m:n was 17:47:36. Differential scanning calorimetry confirmed that the white polymer had a glass transition temperature of 120° C.

REFERENCE EXAMPLE 2

8.8 g of a polyvinyl alcohol-based resin "NH-18" (trade name, available from Nippon Synthetic Chemical Industry Co., Ltd., degree of polymerization: 1,800, degree of saponification: 99.0%) was dried at 105° C. for 2 hours and then dissolved in 167.2 g of dimethylsulfoxide (DMSO). 3.72 g of 2-methoxy-1-naphthaldehyde and 0.80 g of p-toluenesulfonic acid monohydrate were added to the solution, and the whole was stirred at 40° C. for 1 hours. 23.64 g of 1,1-diethoxyethane (acetal obtained by using acetoaldehyde as a starting material) was added thereto, and the whole was stirred at 40° C. for additional 4 hours. Then, 2.13 g of triethylamine was added thereto, to thereby complete the reaction. The obtained reaction product (polymer) was added dropwise into 1 L of methanol for reprecipitation. The polymer obtained through filtration was dissolved in tetrahydrofuran and then reprecipitated again in methanol. After that, the polymer obtained through filtration was dried, to thereby obtain 12.42 g of white polymer.

$^1$H-NMR measurement confirmed that the white polymer was a polyvinyl acetal-based resin having a structure represented by the following formula (VII).

[Chemical Formula 8]

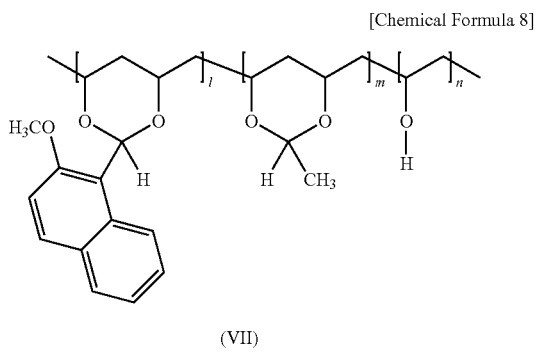

(VII)

In the formula (VII), l:m:n was 13:50:37. Differential scanning calorimetry confirmed that the white polymer had a glass transition temperature of 131° C.

EXAMPLE 1

Polarizer

A polarizing plate ("NPF SIG1423DU" (trade name) manufactured by Nitto Denko Corporation) having a configuration of protective film/polarizer/protective film was used. The polarizing plate had a single axis transmittance of 42.6%, a polarization degree of 99.99%, a hue a-value of −1.5, and a hue b-value of 3.8. A protective film of the polarizing plate substantially had isotropy, Re[550] of 0.5 nm, and Rth[550] of 1.0 nm.

(Formation of First Optical Compensation Layer)

First, 25 parts by weight of polyvinyl acetal-based resin obtained in Reference Example 1 was dissolved in 100 parts by weight of methylethyl ketone to prepare 20% by weight of a solution. This solution was uniformly flow-casted in a sheet shape on the surface of a polyethylene terephthalate film ("Lumirror S27-E" (trade name) manufactured by Toray Industries, Inc.) having a thickness of 75 μm with a comma coater, and the resultant film was put in a multi-chamber type air circulation dry oven (error ±1° C.) and the temperature in the oven was raised gradually from a low temperature at 80° C. for 20 minutes, 120° C. for 20 minutes, and 150° C. for 60 minutes, whereby a solvent was evaporated. After that, the polyethylene terephthalate film was peeled to obtain a polymer film with a width of 300 mm and a thickness of 120 μm. The obtained polymer film had a transmittance of 90%. Further, the obtained polymer film had an average refractive index of 1.50, Re[550] of 2.0 nm, and Rth[550] of 2.0 nm.

Figure 5:
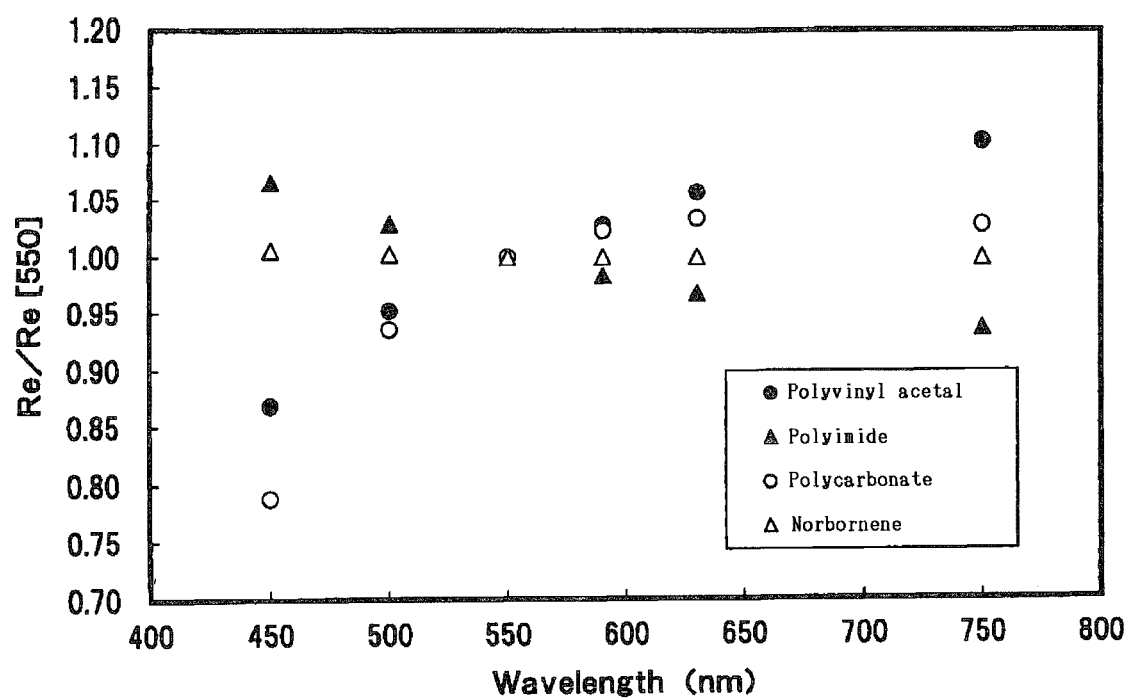
FIG. 5 is a graph showing wavelength dispersion property (Re[λ]/Re[550]) of each polymer film and coating layer.

The polymer film obtained above was uniaxially stretched longitudinally by 2.0 times in a film longitudinal direction at 130±1° C. to form a first optical compensation layer with a thickness of 91 μm. The first optical compensation layer had a refractive index profile of nx>ny=nz, Re[550] of 140 nm, and Rth[550] of 140 nm. Further, the absolute value of a photoelastic coefficient of the first optical compensation layer was 21×10$^{-12}$ (m$^2$/N). Further, FIG. 5 shows wavelength dispersion property (Re[λ]/Re[550]) of the first optical compensation layer by black circles.

(Synthesis of Polyimide)

In a reaction container (500 ml) equipped with a mechanical stirring device, a Dean-Stark apparatus, a nitrogen introduction tube, a thermometer, and a cooling tube, 17.77 g (40 mmol) of 2,2-bis(3,4-dicaroxylphenyl)hexafluoropropanoic dianhydride (manufactured by Clariant (Japan) K.K.) and 12.81 g (40 mmol) of 2,2'-bis(trifluoromethyl)-4,4'-diaminophenyl (manufactured by Wakayama Seika Kogyo Co., Ltd.) were added. Subsequently, a solution in which 2.58 g (20 mmol) of isoquinoline was dissolved in 275.21 g of m-cresol was added to the resultant mixture, followed by stirring (60 rpm) at 23° C. for 1 hour to obtain a uniform solution. Then, the reaction solution was heated to 180±3° C. using an oil bath, followed by stirring for 5 hours while keeping the temperature, whereby a yellow solution was obtained. After further stirring for 3 hours, heating and stirring were stopped, and the solution was allowed to cool to room temperature, whereby a polymer was precipitated in a gel form.

After that, acetone was added to the reaction container to dissolve the gel completely, whereby a diluted solution (7% by weight) was obtained. The diluted solution was added little by little in 2 L of isopropyl alcohol with stirring, whereby white powder was precipitated. The powder was collected by filtration, and washed by being placed in 1.5 L of isopropyl alcohol. The same operation was repeated one more time to wash the powder, and thereafter, white powder was collected again by filtration. The white powder was dried for 48 hours in an air circulation constant temperature oven at 60° C., and dried at 150° C. for 7 hours, whereby polyimide powder represented by the following formula (VIII) (yield: 85%) was obtained. The weight average molecular weight (Mw) of the obtained polyimide was 124,000, and the imidization ratio thereof was 99.9%.

[Chemical Formula 9]

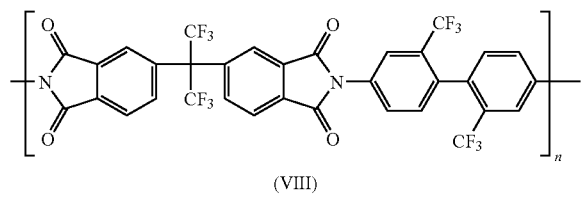

(VIII)

(Formation of Second Optical Compensation Layer)

Polyimide synthesized above was dissolved in methylisobutyl ketone (MIBK) to prepare 15% by weight of a polyimide solution. The solution was applied, in one direction, to the surface of a polyethylene terephthalate film ("Lumirror S27-E" (trade name) manufactured by Toray Industries, Inc.) having a thickness of 75 μm with a rod coater. Then, the resultant film was dried in an air circulation constant temperature oven at 135±1° C. for 5 minutes, and in an air circulation constant temperature oven at 150±1° C. for 10 minutes, whereby a solvent was evaporated. After that, the polyethylene terephthalate film was peeled to obtain a second optical compensation layer with a thickness of 4.5 μm. The second optical compensation layer had a refractive index profile of nx=ny>nz, Re[550] of 1 nm, and Rth[550] of 180 nm. Further, FIG. 5 shows wavelength dispersion property (Re[λ]/Re [550]) of the second optical compensation layer by black triangles.

(Liquid Crystal Cell)

A liquid crystal panel was taken out from a liquid crystal display apparatus ("32V type TH-32LX10" manufactured by Matsushita Electric Industrial Co., Ltd.) including a liquid crystal cell of a VA mode, and optical films such as polarizing plates and the like placed on upper and lower sides of the liquid crystal cell were all removed. Front and back surfaces of the obtained liquid crystal cell were washed to obtain a liquid crystal cell A.

(Production of Liquid Crystal Panel)

The first optical compensation layer was attached to a viewer side of the liquid crystal cell A obtained above via an acrylic pressure-sensitive adhesive layer (thickness: 20 μm). At this time, the first optical compensation layer was attached to the liquid crystal cell A so that the longitudinal direction of the liquid crystal cell A and the slow axis direction of the first optical compensation layer were substantially perpendicular to each other. Then, the polarizing plate was attached to a viewer side of the first optical compensation layer via an acrylic pressure-sensitive adhesive layer (thickness: 20 μm). At this time, the polarizing plate was attached to the first optical compensation layer so that the longitudinal direction of the liquid crystal cell A and the absorption axis direction of the polarizing plate were substantially parallel to each other. Thus, the slow axis direction of the first optical compensation layer and the absorption axis direction of the polarizing plate were substantially perpendicular to each other.

The second optical compensation layer was attached to a backlight side of the liquid crystal cell A via an acrylic pressure-sensitive adhesive layer (thickness: 20 μm). At this time, the second optical compensation layer was attached to the liquid crystal cell A so that the longitudinal direction of the liquid crystal cell A and the slow axis direction of the second optical compensation layer were substantially perpendicular to each other. Then, the polarizing plate was attached to the backlight side of the second optical compensation layer via an acrylic pressure-sensitive layer (thickness: 20 μm). At this time, the polarizing plate was attached to the second optical compensation layer so that the longitudinal direction of the liquid crystal cell A and the absorption axis direction of the polarizing plate were substantially perpendicular to each other. Thus, the absorption axis direction of the polarizing plate placed on the viewer side of the liquid crystal cell and the absorption axis direction of the polarizing plate placed on the backlight side of the liquid crystal cell were substantially perpendicular to each other. Thus, a liquid crystal panel A was obtained.

(Production of Liquid Crystal Display Apparatus)

The liquid crystal panel A was connected to a backlight unit of a liquid crystal display apparatus ("32V type TH-32LX10" manufactured by Matsushita Electric Industrial Co., Ltd.), whereby a liquid crystal display apparatus A was produced.

EXAMPLE 2

Formation of First Optical Compensation Layer

First, 25 parts by weight of polyvinyl acetal-based resin obtained in Reference Example 2 was dissolved in 100 parts by weight of methylethyl ketone to prepare 20% by weight of a solution. This solution was uniformly flow-casted in a sheet shape on the surface of a polyethylene terephthalate film ("Lumirror S27-E" (trade name) manufactured by Toray Industries, Inc.) having a thickness of 70 μm with a comma coater, and the resultant film was heated gradually from a low temperature at 80° C. for 20 minutes, 120° C. for 20 minutes, and 150° C. for 60 minutes in a multi-chamber type air circulation dry oven (error ±1° C.), whereby a solvent was evaporated. After that, the polyethylene terephthalate film was peeled to obtain a polymer film with a width of 300 mm and a thickness of 96 μm. The obtained polymer film had a transmittance of 92%. Further, the obtained polymer film had an average refractive index of 1.53, Re[550] of 2.0 nm, and Rth[550] of 1.9 nm.

The polymer film obtained above was uniaxially stretched longitudinally by 1.5 times in a film longitudinal direction at 150±1° C. to form a first optical compensation layer with a thickness of 64 μm. The first optical compensation layer had a refractive index profile of nx>ny=nz, Re[550] of 140 nm, and Rth[550] of 140 nm. Further, the absolute value of a photoelastic coefficient of the first optical compensation layer was $24 \times 10^{-12}$ (m$^2$/N).

(Production of Liquid Crystal Display Apparatus)

A liquid crystal panel and a liquid crystal display apparatus were produced in the same way as in Example 1, except for using the first optical compensation layer obtained above.

COMPARATIVE EXAMPLE 1

A liquid crystal panel and a liquid crystal display apparatus were produced in the same way as in Example 1, except for using a polymer film ("PURE-ACE WR" (trade name) with a thickness of 74 μm, manufactured by Teijin Chemicals Ltd.) mainly containing polycarbonate as the first optical compensation layer. The polymer film had Re[550] of 142 nm and Rth[550] of 140 nm. Further, FIG. 5 shows wavelength dispersion property (Re[λ]/Re[550]) of the first optical compensation layer by white circles.

As shown in FIG. 5, the first optical compensation layer (a retardation film containing a polyvinyl acetal-based resin) in Example 1 exhibited ideal wavelength dispersion property particularly in a long wavelength range, compared with the first optical compensation layer (a retardation film mainly containing polycarbonate) in Comparative Example 1. For example, the first optical compensation layer of Example 1 had Re[750]/Re[550] of 1.102, while the first optical compensation layer of Comparative Example 1 had Re[750]/Re[550] of 1.027. Further, the second optical compensation layer (polyimide layer) had R40[750]/R40[550] of 0.936.

Figure 6:
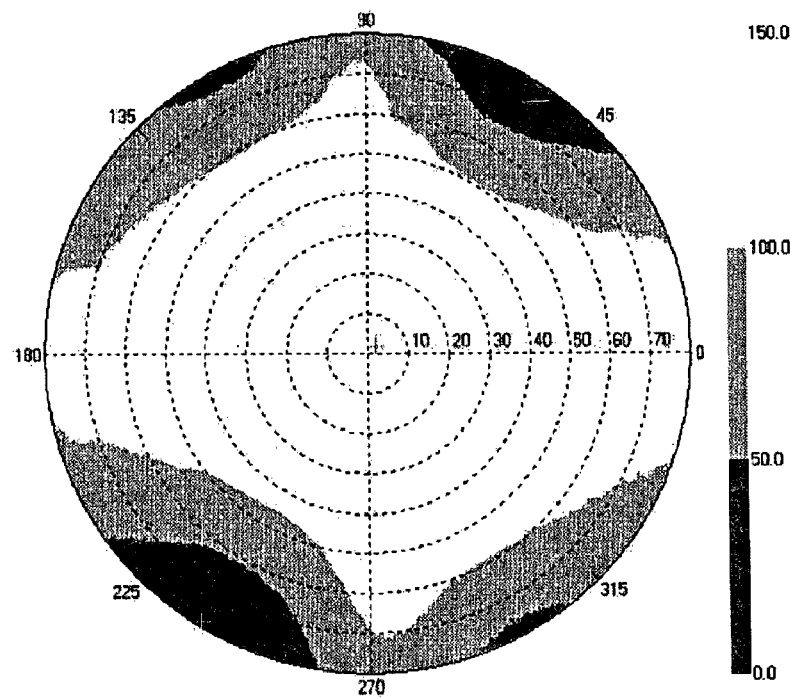
FIG. 6(a) is a contrast contour map showing viewing angle dependence of a contrast of a liquid crystal display apparatus according to Example 1 of the present invention.
FIG. 6(b) is a contrast contour map showing viewing angle dependence of a contrast of a liquid crystal display apparatus according to Comparative Example 1.
Figure 6:
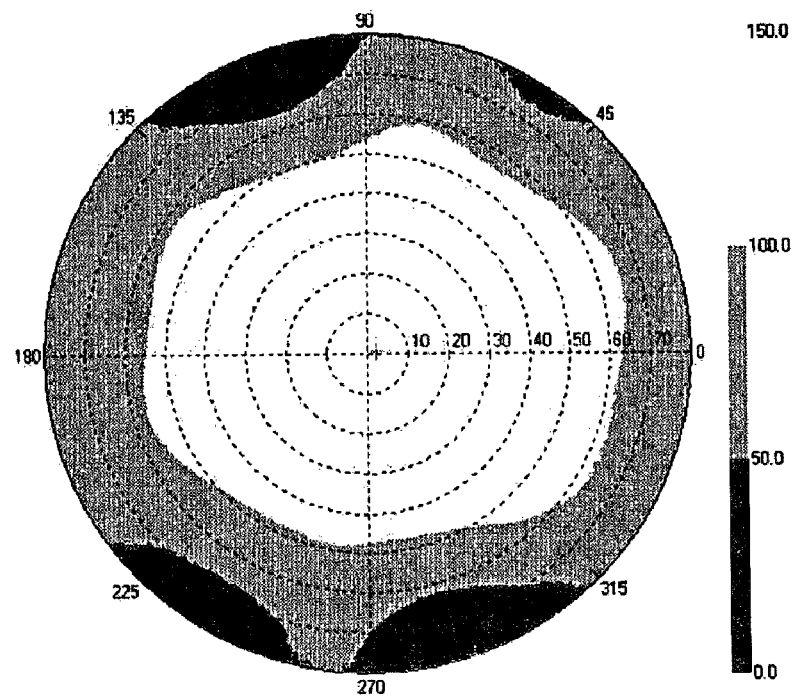

The viewing angle dependence of a contrast of the liquid crystal display apparatus of Example 1 is shown in a contrast contour map in FIG. 6(a), and the viewing angle dependence of a contrast of the liquid crystal display apparatus of Comparative Example 1 is shown in a contrast contour map in FIG. 6(b). Example 1 is understood to be excellent both in a contrast in a front direction and a contrast in an oblique direction, compared with Comparative Example 1. In particular, Example 1 is understood to be excellent in a contrast in a lateral direction (to have a wide viewing angle in right and left directions).

Figure 7:
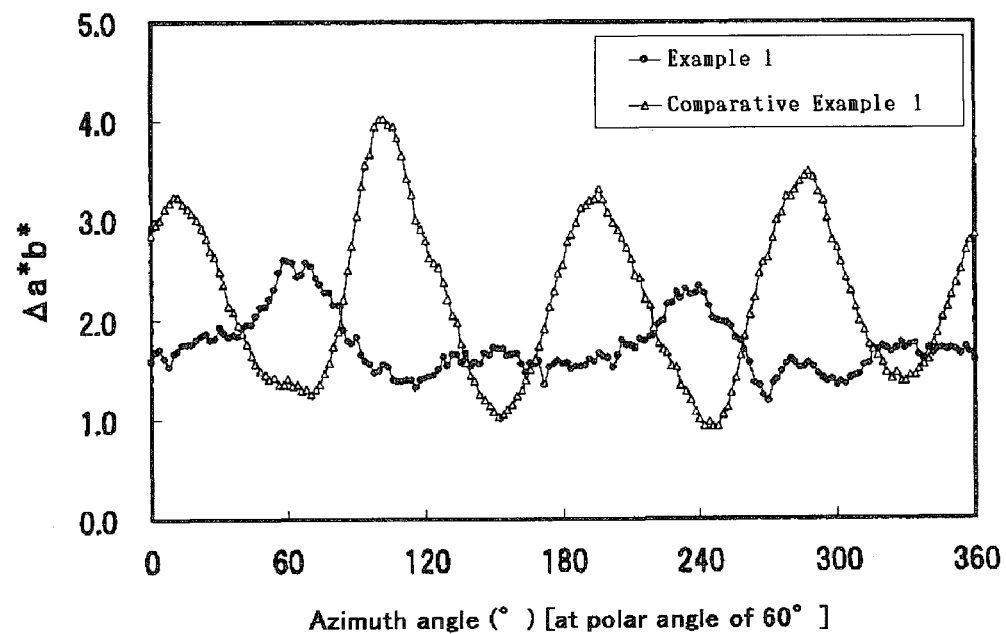
FIG. 7 is a graph showing measurement results of a color shift amount (Δa*b*) of the liquid crystal display apparatuses according to Example 1 of the present invention and Comparative Example 1.
Figure 8:
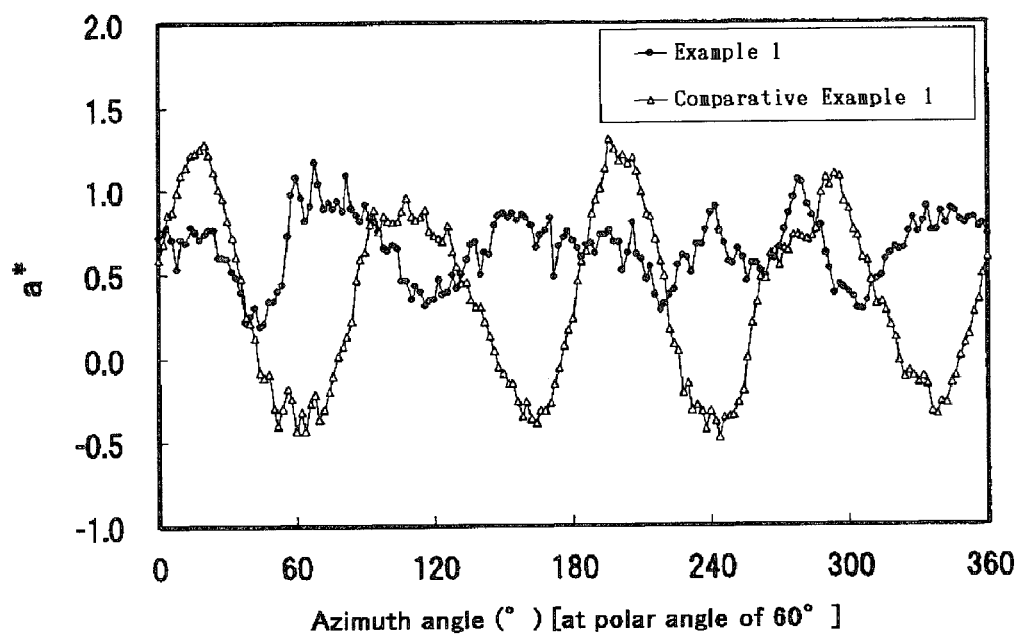
FIG. 8 is a graph showing measurement results of a color shift (a*) of the liquid crystal display apparatuses according to Example 1 of the present invention and Comparative Example 1.
Figure 9:
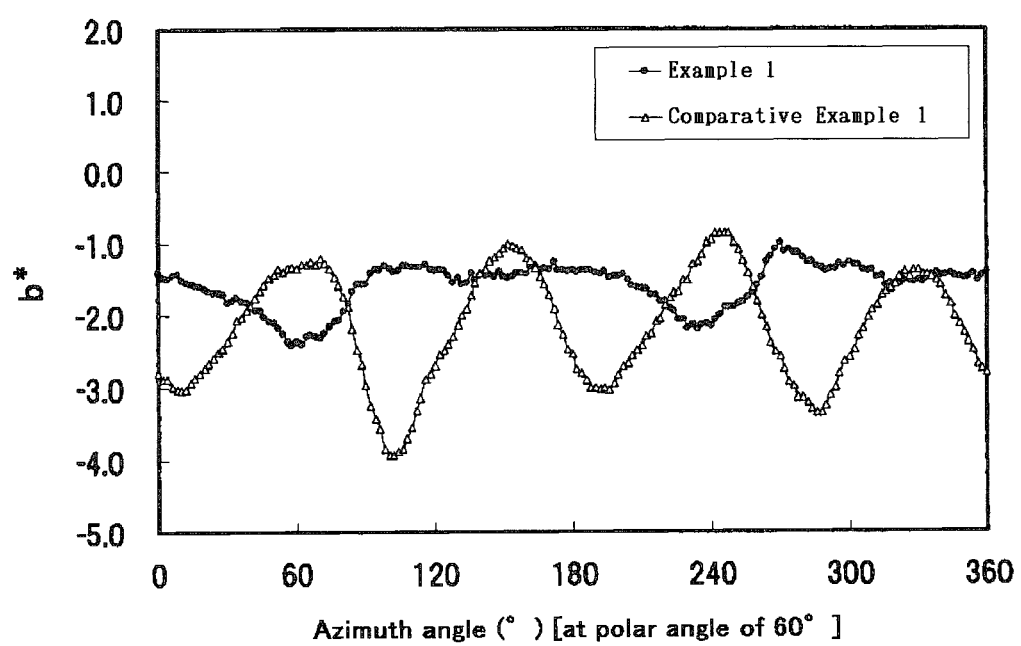
FIG. 9 is a graph showing measurement results of a color shift (b*) of the liquid crystal display apparatuses according to Example 1 of the present invention and Comparative Example 1.

FIG. 7 shows measurement results of a color shift amount (Δa*b*) of the liquid crystal display apparatuses of Example 1 and Comparative Example 1, FIG. 8 shows measurement results of a color shift (a*) thereof, and FIG. 9 shows measurement results of a color shift (b*) thereof. As is apparent from FIGS. 7 to 9, it is understood that in Example 1, the change amounts of Δa*b*, a* and b* depending upon an azimuth angle are smaller, and a color shift in an oblique direction is smaller even when a screen is observed from any azimuth angles of 0° to 360°, compared with those in Comparative Example 1.

It was confirmed that, even when the first optical compensation layer made of a polyvinyl acetal-based resin (chemical formula (VII) having a naphthyl ring was used in place of the polyvinyl acetal-based resin represented by the chemical formula (VI) of Example 1, the same results as those in Example 1 are obtained.

INDUSTRIAL APPLICABILITY

The liquid crystal display apparatus of the present invention is preferably applicable to a liquid crystal television, a mobile telephone, and the like.

The invention claimed is:

1. A liquid crystal panel, comprising:
   a liquid crystal cell;
   a first polarizer placed on one side of the liquid crystal cell;
   a second polarizer placed on the other side of the liquid crystal cell; and
   a first optical compensation layer and a second optical compensation layer placed between the first polarizer and the second polarizer, wherein:
   the first optical compensation layer is placed between the first polarizer and the liquid crystal cell;
   a slow axis direction of the first optical compensation layer is substantially perpendicular to an absorption axis direction of the first polarizer;
   the first optical compensation layer has a refractive index profile of nx>ny≧nz;
   the first optical compensation layer includes a retardation film (A) which contains a polyvinyl acetal-based resin and whose in-plane retardation value (Re[750]) at a wavelength of 750 nm is larger than an in-plane retardation value (Re[550]) at a wavelength of 550 nm;
   the second optical compensation layer is placed between the first optical compensation layer and the second polarizer; and
   the second optical compensation layer has a refractive index profile of nx=ny>nz.

2. A liquid crystal panel according to claim 1, wherein an in-plane retardation value (Re[750]) at a wavelength of 750 nm of the second optical compensation layer is smaller than an in-plane retardation value (Re[550]) at a wavelength of 550 nm of the second optical compensation layer.

3. A liquid crystal panel according to claim 1, wherein a difference (ΔD=D$_1$−D$_2$) between a wavelength dispersion value (D$_1$) of the first optical compensation layer and a wavelength dispersion value (D$_2$) of the second optical compensation layer is 0.1 or more.

4. A liquid crystal panel according to claim 1, wherein the liquid crystal cell includes a liquid crystal layer containing liquid crystal molecules aligned homeotropically in an absence of an electric field.

5. A liquid crystal panel according to claim 1, wherein the polyvinyl acetal-based resin includes a repeating unit represented by the following general formula (I):

[Chemical Formula 1]

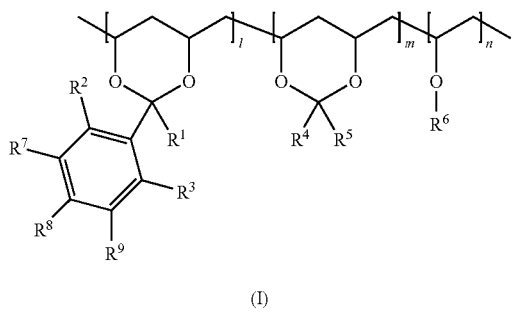

(I)

where R$^1$, R$^4$, and R$^5$ independently represent a hydrogen atom, a straight-chain or branched-chain alkyl group containing 1 to 8 carbon atoms, a cycloalkyl group containing 5 to 10 carbon atoms, a phenyl group, a naphthyl group, a hetero-ring group, an anthranyl group, or a phenanthrenyl group, and the cycloalkyl group, the phenyl group, the naphthyl group, the hetero-ring group, the anthranyl group, and the phenanthrenyl group may respectively have a substituent;

$R^2$, $R^3$, $R^7$, $R^8$, and $R^9$ independently represent a hydrogen atom, a straight-chain or branched-chain alkyl group containing 1 to 4 carbon atoms, a straight-chain or branched-chain alkoxyl group containing 1 to 4 carbon atoms, an alkoxycarbonyl group, an acyloxy group, a halogen atom, a halogenated alkyl group, a nitro group, an amino group, an azido group, a hydroxyl group, a cyano group, or a thiol group, provided that $R^2$ and $R^3$ are not hydrogen atoms simultaneously;

$R^6$ represents a hydrogen atom, a straight-chain or branched-chain alkyl group containing 1 to 8 carbon atoms, a benzyl group, a silyl group, a phosphate group, an acyl group, a benzoyl group, or a sulfonyl group;

two groups adjacent to each other, selected from $R^2$, $R^3$, $R^7$, $R^8$, and $R^9$ may form a benzene ring to form a naphthyl ring, the naphthyl ring may have, as a substituent, a halogen atom, a straight-chain or branched-chain alkyl group containing 1 to 4 carbon atoms, a straight-chain or branched-chain halogenated alkyl group containing 1 to 4 carbon atoms, a straight-chain or branched-chain alkoxy group containing 1 to 4 carbon atoms, an alkoxycarbonyl group, an acyloxy group, an amino group, an azido group, a nitro group, a cyano group, or a hydroxyl group; and l, m, and n represent an integer of 2 or more.

6. A liquid crystal panel according to claim 1, wherein the retardation film (A) has an absolute value of a photoelastic coefficient of $40 \times 10^{-12}$ (m$^2$/N) or less.

7. A liquid crystal panel according to claim 1, wherein the second optical compensation layer includes a retardation film (B) containing a polyimide-based resin.

8. A liquid crystal display apparatus comprising the liquid crystal panel according to claim 1.

* * * * *